United States Patent [19]

Taylor et al.

[11] Patent Number: 4,515,468

[45] Date of Patent: May 7, 1985

[54] COMBINED PHOTOGRAPHIC ENLARGER AND PRINT DEVELOPING TRAY

[75] Inventors: Charles E. Taylor, Westlake Village; Anton Gattiker, Playa Del Rey; Gary B. Krantz, Reseda, all of Calif.

[73] Assignee: Phase One Products, Corp., Westlake Village, Calif.

[21] Appl. No.: 479,037

[22] Filed: Mar. 25, 1983

[51] Int. Cl.³ .............. G03B 27/32; G03B 27/52; G03D 17/00

[52] U.S. Cl. .............................. 355/27; 354/307; 354/337; 355/32; 355/44

[58] Field of Search .................. 355/21, 27, 28, 32, 355/67, 62, 44, 71; 354/337, 308, 89, 307, 312, 324; 366/165; 134/94

[56] References Cited

U.S. PATENT DOCUMENTS

| | | | |
|---|---|---|---|
| 312,937 | 2/1885 | Walker | 355/21 |
| 722,052 | 3/1903 | Sloan | 354/308 |
| 891,347 | 6/1908 | Kroedel | 355/21 |
| 1,036,557 | 8/1912 | Peters et al. | 355/21 |
| 1,088,030 | 2/1914 | Leeds | 355/71 |
| 2,930,306 | 3/1960 | Goodman | 354/307 |
| 3,465,664 | 9/1969 | Bochman | 354/312 |
| 3,644,036 | 2/1972 | Canfield | 355/44 |
| 3,722,394 | 3/1973 | Sebastian | 134/94 |
| 3,890,043 | 6/1975 | Pramstraller | 355/62 |
| 3,903,540 | 9/1975 | Hampl | 354/312 |
| 3,923,394 | 12/1975 | Frankiewicz | 355/32 X |
| 4,104,671 | 8/1978 | Harrigan | 355/27 X |
| 4,117,501 | 9/1978 | Peck | 354/89 |
| 4,128,333 | 12/1978 | Levin et al. | 355/67 |
| 4,138,689 | 2/1979 | Montalbano | 354/337 |
| 4,143,976 | 3/1979 | Paterson et al. | 366/165 |
| 4,157,868 | 6/1979 | Needleman | 354/307 |
| 4,222,655 | 9/1980 | Norris | 355/27 X |
| 4,239,376 | 12/1980 | Wyller | 355/27 |
| 4,332,455 | 6/1982 | Stettner | 354/324 |

*Primary Examiner*—Richard A. Wintercorn
*Attorney, Agent, or Firm*—Jack C. Munro

[57] ABSTRACT

A light-tight, elongated, hollow tapered wall base to which a slide housing is movably connected. The slide housing includes a light source which produces a light beam which passes through a filter assembly and a lens assembly to the bottom of the base. A photographic transparency is to be mounted within a slide holder which in turn is movably located in a close fitting relationship within a slide receiving station. The slide receiving station is formed within the slide housing between the filter assembly and the lens assembly. Removably connected to the bottom of the base is a photographic print tray assembly. The photographic print tray assembly includes a focusing target. The image projected from the photographic transparency is to be observed on the focusing target by a view port which is formed within the base. At the desired time, the focusing target is to be removed and the projected image utilized to expose an unexposed photographic print which has previously been incorporated within the photographic print tray assembly.

36 Claims, 27 Drawing Figures

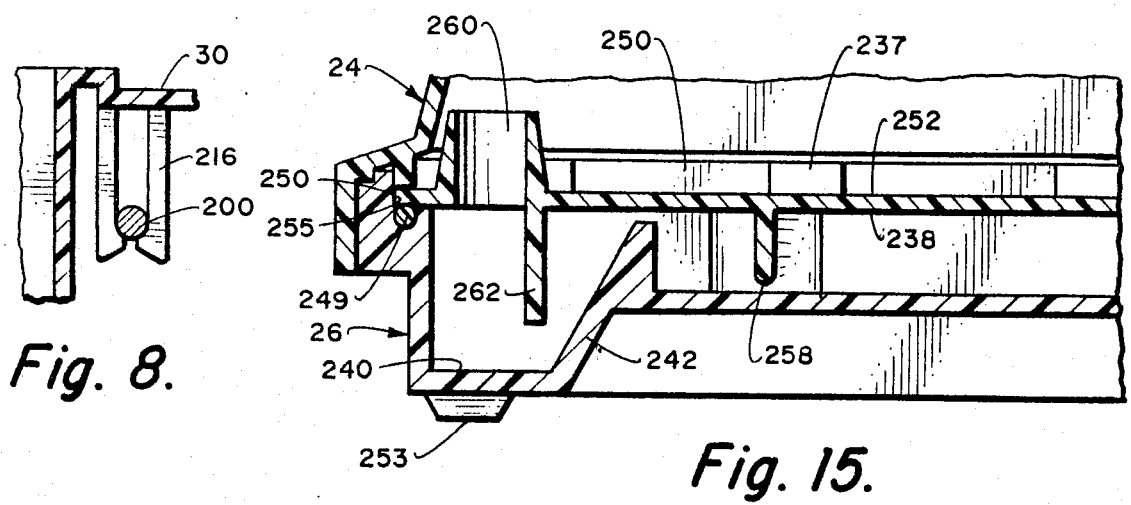
Fig. 8.
Fig. 15.
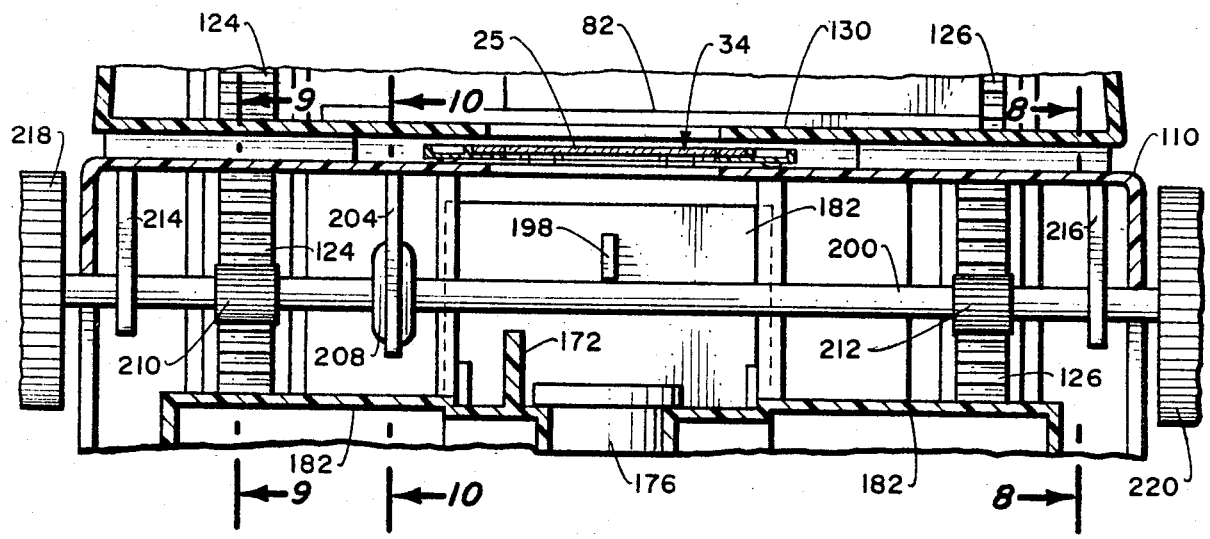
Fig. 7.
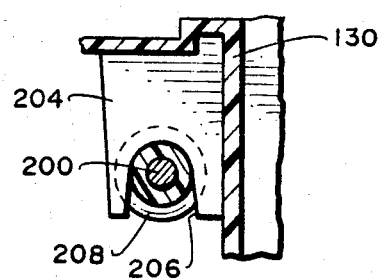
Fig. 10.
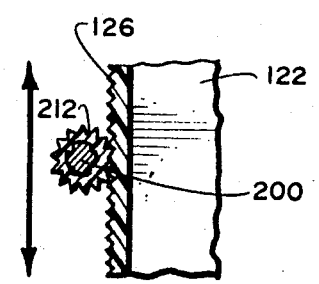
Fig. 9.

Fig. 11.

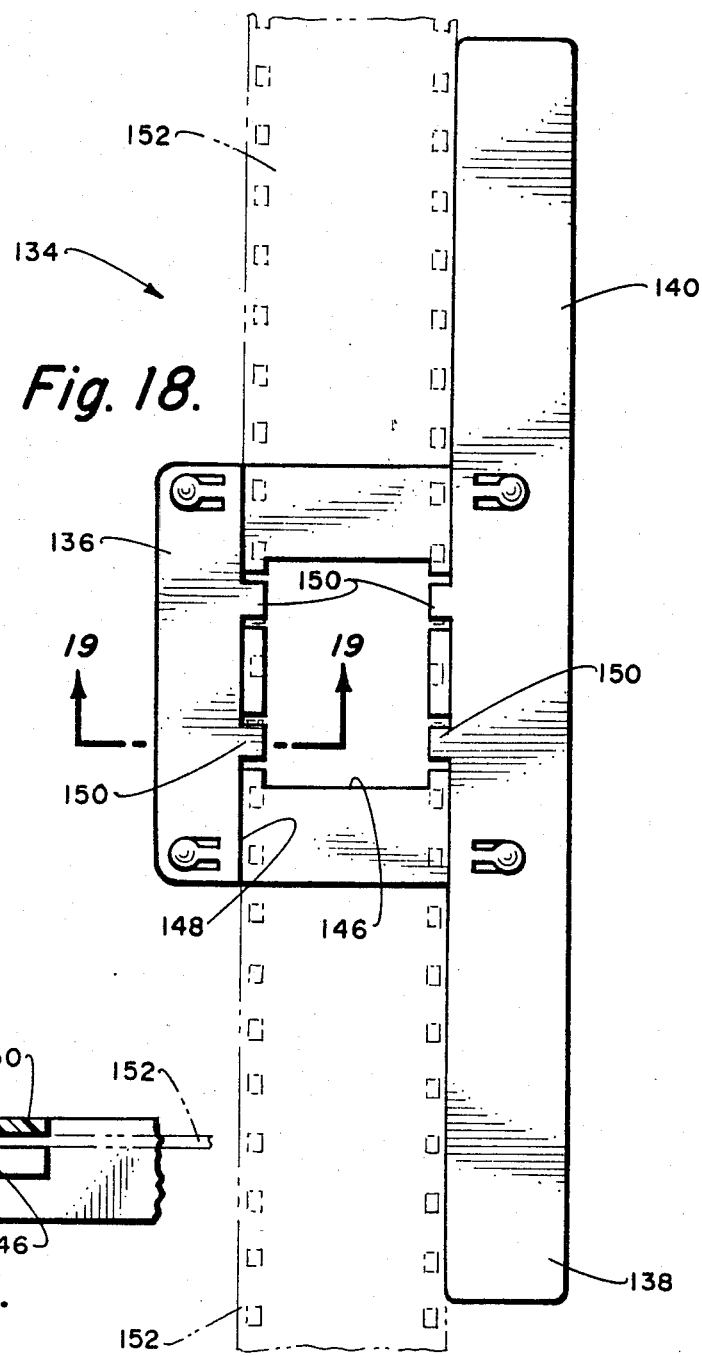

COMBINED PHOTOGRAPHIC ENLARGER AND PRINT DEVELOPING TRAY

BACKGROUND OF THE INVENTION

The field of this invention relates to color photographic printing, and in particular to an apparatus for the reproduction of an enlarged photographic print from a photographic negative or transparency, in a lighted environment without the aid of a darkroom.

In recent years, there has been significantly increased public interest in photography as a hobby. Particularly, home printing of pictures has increased markedly. Typical tools of the photographer are a darkroom and associated darkroom equipment, which includes an enlarger and processing equipment.

The various manipulative steps necessary in creating the picture must be conducted in the absence of extraneous light that would effect the light sensitive photographic material. The common photographic procedure is to form an image on film; and which is capable of transmitting colored light in amounts controlled by the image intensity. Colored prints are produced in either the same size or an enlarged size by transmitting light through the film causing the transmitted light to impinge upon a light sensitive paper. This operation must be done in an area where light other than the transmitted light through the film is excluded.

The use of the darkroom is normally a necessity to perform the photographic processes to create durable pictures from light images. The darkroom is a fixed, enclosed area, generally a room in a house or building from which all outside light can be excluded. This darkroom requires a considerable amount of space. It is generally impractical, particularly for non-professional photographers, to set aside such a space for this purpose alone. The darkroom is probably the greatest obstacle preventing people from enjoying photography as a hobby. Many dwellings, particularly apartments, simply are not large enough to allow an entire room to be continuely used as a darkroom. The part time use of a bathroom or closet necessitates bothersome and time consuming unpacking and packing of photographic equipment before and after use.

Also, many individual would like to take advantage of reproducing photographic prints and enlarged photographic prints from photographic transparencies without necessitating the constructing of a darkroom. An individual may have an extensive library of 35 millimeter photographic slides (common terminology for a photographic transparency) and that individual may desire to produce a print of a particular slide. If the individual does not have a darkroom, he must then take the slide to a photographic print reproduction print facility and have the print reproduced.

Instead of the individual having to utilize outside reproduction facilities or a darkroom, it would be of great advantage to utilize a compact, portable photographic printmaker which could be utilized within the individual's home or apartment, easy to operate by a person of minimal skill or training, which produces the print in a short period of time and which can be manufactured at a relatively minimal cost.

SUMMARY OF THE INVENTION

The present invention relates to an apparatus for printing both black and white and color photographic prints without a darkroom. An unexposed photographic print material (positive) is to be located within a print developing tray assembly. The tray assembly is to include appropriate fluid channels to accommodate print developing liquid to develope the exposed print without requiring removal from the tray and exposure to undesirable light. The tray assembly is to be removably secured to the bottom of a secondary base. The secondary base is essentially tubular defining an open ended interior chamber. The side wall of the secondary base is essentially tapered, with the bottom being larger in area than the top. Connected at the top is a primary base which is connected to a slide housing. The slide housing includes a lens assembly, a slide receiving station, a filter assembly, a light source and appropriate electronic circuitry in order to expose the print with the correct amount of light to achieve the highest quality print. The lens assembly is deemed to be conventional, but utilizes a shutter which can be moved to cover the lens when exposing the film and the shutter is to be moved away from the lens when viewing prior to exposing of the film. The shutter includes a small diametered aperture through which light passes during exposure of the film. The slide housing includes a slide receiving station. A slide holder is to be locatable within the slide receiving station. The slide holder is to have mounted thereon a photographic transparency. The slide holder is to be adjustable within the slide receiving station so as to adjust the position of the photographic transparency with respect to the path of the beam of light so as to vary the position of the image which is to be projected onto the unexposed film. Located between the light source and the photographic transparency is a filter assembly. The filter assembly is to be adjusted during viewing to reproduce a desired color within the target area, which in turn, will be duplicated on the resultingly produced photographic print. The slide housing is movable with respect to the base through means of a manually operated gear assembly. Appropriate electronics are included within the slide housing to adjust the light source so as to compensate for different types of film plus to "read" the actual amount of light which is being transmitted through the photographic transparency so as to control the time of exposure based upon slide density. The tray is utilized not only to expose the print, but the print is developed within the tray.

One object of the present invention is to provide an apparatus for printing photographic pictures without the aid of a darkroom.

Another object of the present invention is to utilize a photographic printer to reproduce both color and black and white transparencies.

Another objective of this invention is to utilize the exposure tray also as a developing tray for the developing of the exposed print.

Another objective of this invention is to construct a photographic transparency apparatus which can be manufactured and sold inexpensively.

Another objective of this invention to construct a photographic print producing apparatus which can be operated by an individual with minimum skill or training.

Another objective of this invention is to construct a photographic print reproducing apparatus wherein the photographic print is produced in a very short period of time and which does not require the need of any exterior facility.

BRIEF DESCRIPTION OF THE DRAWINGS

FIG. 7 is a view partly-in-cross-section taken along line 7—7 of FIG. 6;

FIG. 8 is a view partly-in-cross-section showing the mounting arrangement for the manually operated rotating shaft which is utilized to move the slide housing in respect to the base taken along line 8—8 of FIG. 7;

FIG. 9 is a cross-sectional view of the gearing arrangement utilized in producing the movement of the slide housing in respect to the base taken along line 9—9 of FIG. 7;

FIG. 10 is a cross-sectional view taken along line 10—10 of FIG. 7 showing in more detail the frictional drag arrangement which is utilized in conjunction with the shaft, which when turned, produces the movement of the slide housing in respect to the base;

FIG. 11 is a cross-sectional view taken along line 11—11 of FIG. 1 showing in more detail the construction of the slide housing utilized in conjunction with the apparatus of the present invention;

FIG. 15 is a cross-sectional view taken along line 15—15 of FIG. 13;

FIG. 18 is a bottom plan view of the slide holder of FIG. 17 showing the portion of the slide holder which is to be connectable with a photographic transparency in strip form;

FIG. 19 is a cross-sectional view taken along line 19—19 of FIG. 18;

DETAILED DESCRIPTION OF THE SHOWN EMBODIMENT

Figure 1:
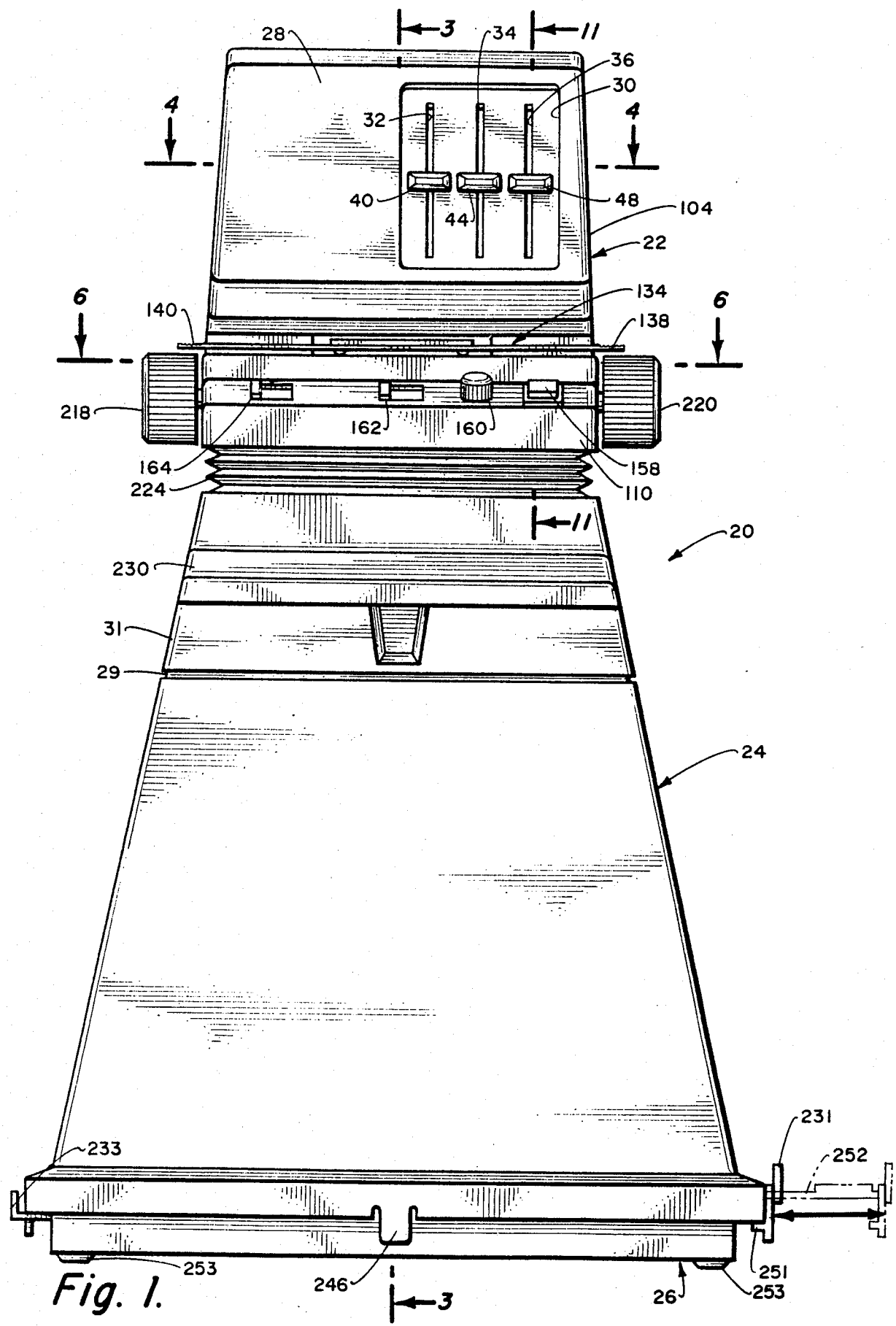
FIG. 1 is a front, elevational view of the combined photographic enlarger and print developing tray of this invention.

Referring particularly to the drawings, there is shown the apparatus 20 of this invention which is composed generally of a slide housing 22, a primary base 31, a secondary base 24, and a tray assembly 26. The slide housing 22, the primary base 31, the secondary base 24 and the tray assembly 26, are each to be constructed of a rigid, readily formable material, such as a plastic. However, the material of construction is deemed to be a matter of choice. The secondary base 24 is hollow. The top of secondary base 24 includes a necked-down section 29. The bottom of the base 31 interlocks by overlapping with the necked-down section 29. It is to be understood that any desirable height of base 24 could be used and actually there could be available two or three different bases 24. The height of a base 24 determines the extent of magnification of the resultant produced photographic print.

Looking at the exterior surface of the slide housing 22, a recessed section 30 is formed within the front wall 28. Within the recessed section 30 there are formed three in number of elongated openings 32, 34 and 36. The openings 32, 34 and 36 are evenly spaced apart and are parallel to each other. Slidably mounted within the opening 32 is a narrowed section of an arm 38. The outer end of the arm 38 connects to knob 40. The inner surface of the knob 40 is snug against the exterior surface of the recess 30 which is located directly around the opening 32. In a similar manner, the narrowed down section of the arm 42 is located within opening 34 with the outer end of the arm 42 being attached to a knob 44. Still further, in a similar manner, the narrowed down section of the arm 46 connects with the opening 36 with the outer end of the arm 46 being attached to knob 48. Each of the knobs 40, 44 and 48 are individually movable within the recessed area 30. Upon release of any of the knobs 40, 44 or 48, it will automatically remain in the established position.

A pin 50 rests on top of the arm 38. Similarly, a pin 52 rests on top of the arm 42 and a pin 54 rests on top of the arm 46. Pin 50 is attached to a color filter 56. Similarly, the pin 52 is attached to a color filter 58 and the pin 54 is attached to a color filter 60. The back side of each of the filters 56, 58 and 60 include an opening through which extends a mounting pin 62. Each of the filters 56, 58 and 60 are pivotally mounted on the pin 62. The pin 62 is held in place between upstanding arms 64 and 66, which are in turn integrally secured to interior wall 68. The pin 62 is held in position on the arms 64 and 66 by means of a hook arm 70 which is also integrally mounted on the interior wall 68 and extends therefrom. The hook 70 is located between the arms 64 and 66 and with respect to the pin 62, is located diametrically opposite the arms 64 and 66. The arm 70 has a limited amount of resiliency to facilitate deflection to permit locating of the pin 62 in its proper position within the cradles of the arms 64 and 66.

Figure 11:
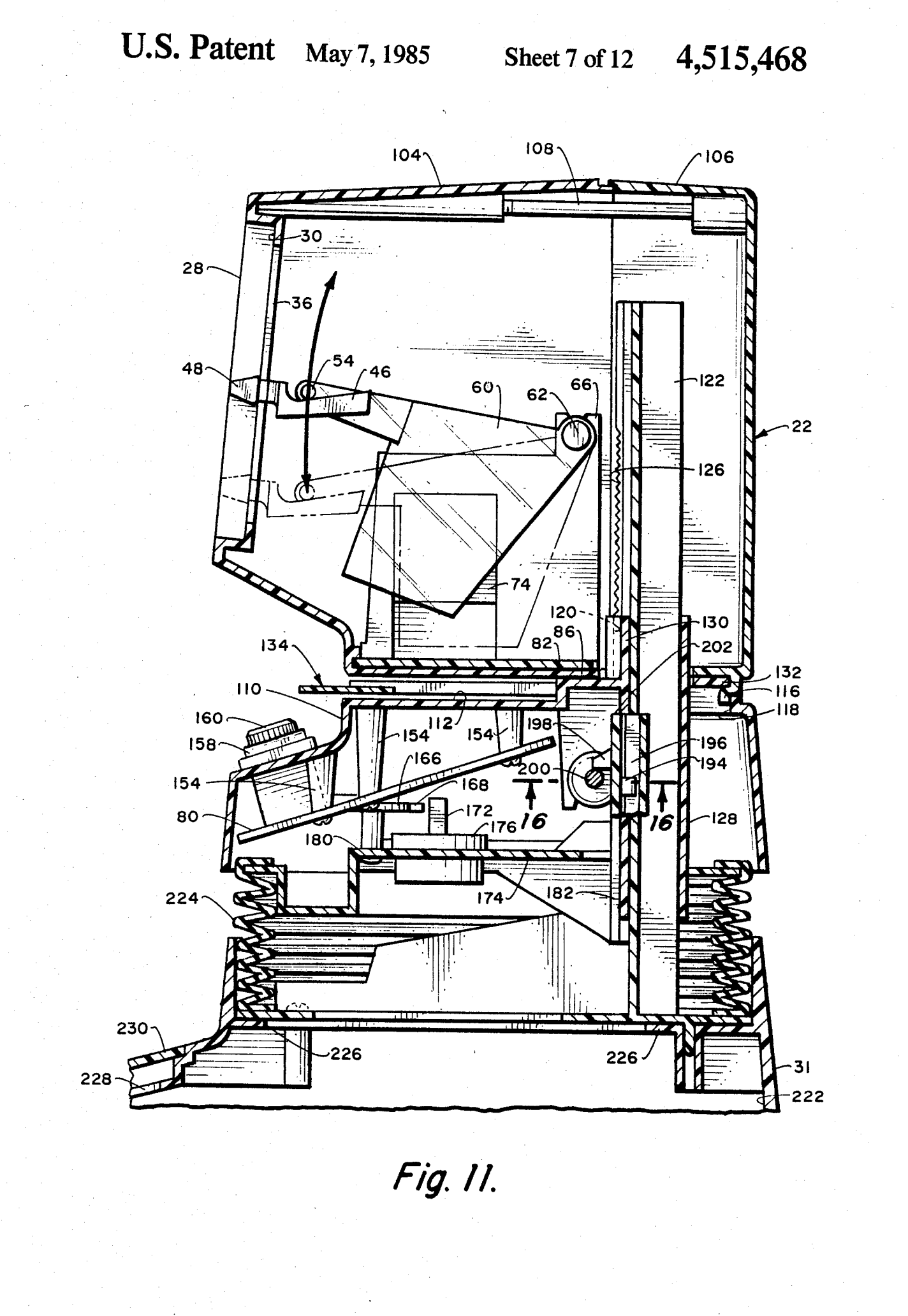

By moving the knobs 40, 44 and 48, it can thus be seen that their respective color filters 56, 58 and 60, which are each substantially sheet material in configuration, can be pivoted from a lower position shown in dotted lines in FIG. 11 to an upper position (not shown) but represented in an intermediate state by the solid line position in FIG. 11. The movement of the filters 40, 44 and 48 is to optionally locate a filter, or combinations thereof, within the path of the light beam to be described further on in the specification.

The reason for the use of the filters 56, 58 and 60 is that color printing materials are sensitive to three primary colors. These three colors are yellow, magenta and cyan. Each filter may include various intensities of its respective color. The intensity of each color within each filter is variable depending upon the type of color of photographic film used for the transparency, the type of printing paper, the chemicals used in processing the paper, the type and amount of light from the light source used for the printing and the time of exposure to achieve the print. As will become apparent further on in the description, the user will be able to move a single individual filter or any two or three filters within the path of the light beam in order to achieve a desirable color combination in the photographic print that is to be produced.

The filters 56, 58 and 60 are conducted through a gap 72 which is formed between the interior wall 68 and light housing wall 74. Mounted within the light housing wall 74 is a light source in the form of a quartz-halogen light bulb 76. The bulb 76 is connected through wire 78 to a source of electrical energy (not shown). The source of electrical energy is to control the duration of operation of the light bulb 76 by means of electrical circuitry which is incorporated within a printed circuit board 80. The location of the printed circuit board will be described in more detail further on in the specification. It may be desirable to utilize one bulb for exposure and a second bulb for viewing.

Both the interior wall 68 and the light housing wall 74 are integrally mounted on a planar sheet 82. The sheet 82 is fixedly secured by fasteners 84 to the bottom wall 86 of the slide housing 22. The interior surface of the inner wall 68 includes a white reflective surface coating 88. This coating 88 is to function to mix and reflect the light from the bulb 76 along a path represented by arrow 100 through opening 102 formed within the bottom wall 86.

Figure 2:
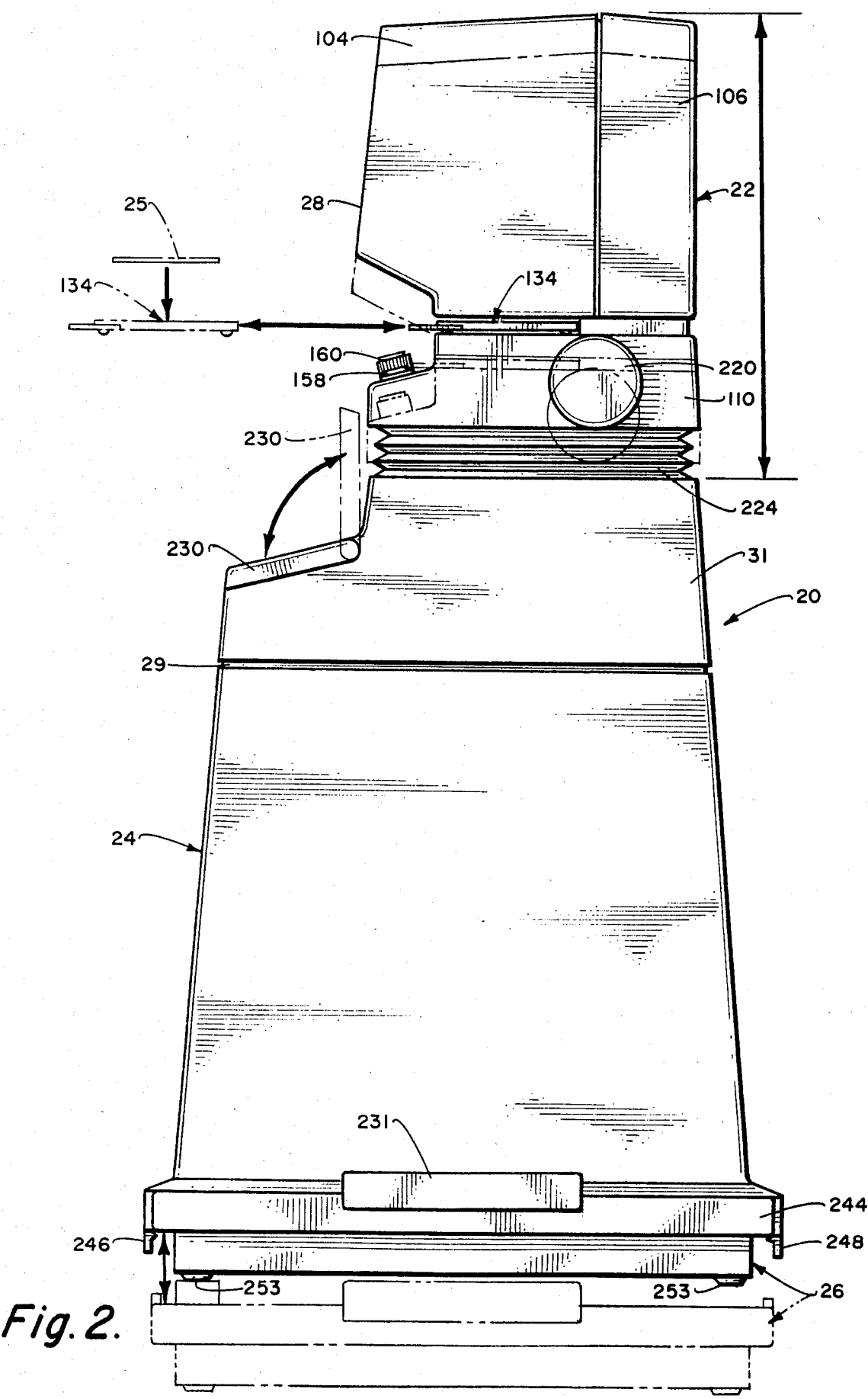
FIG. 2 is a right side view of the combined enlarger and print developing tray of the present invention showing movement of the various parts in respect to each other.
Figure 3:
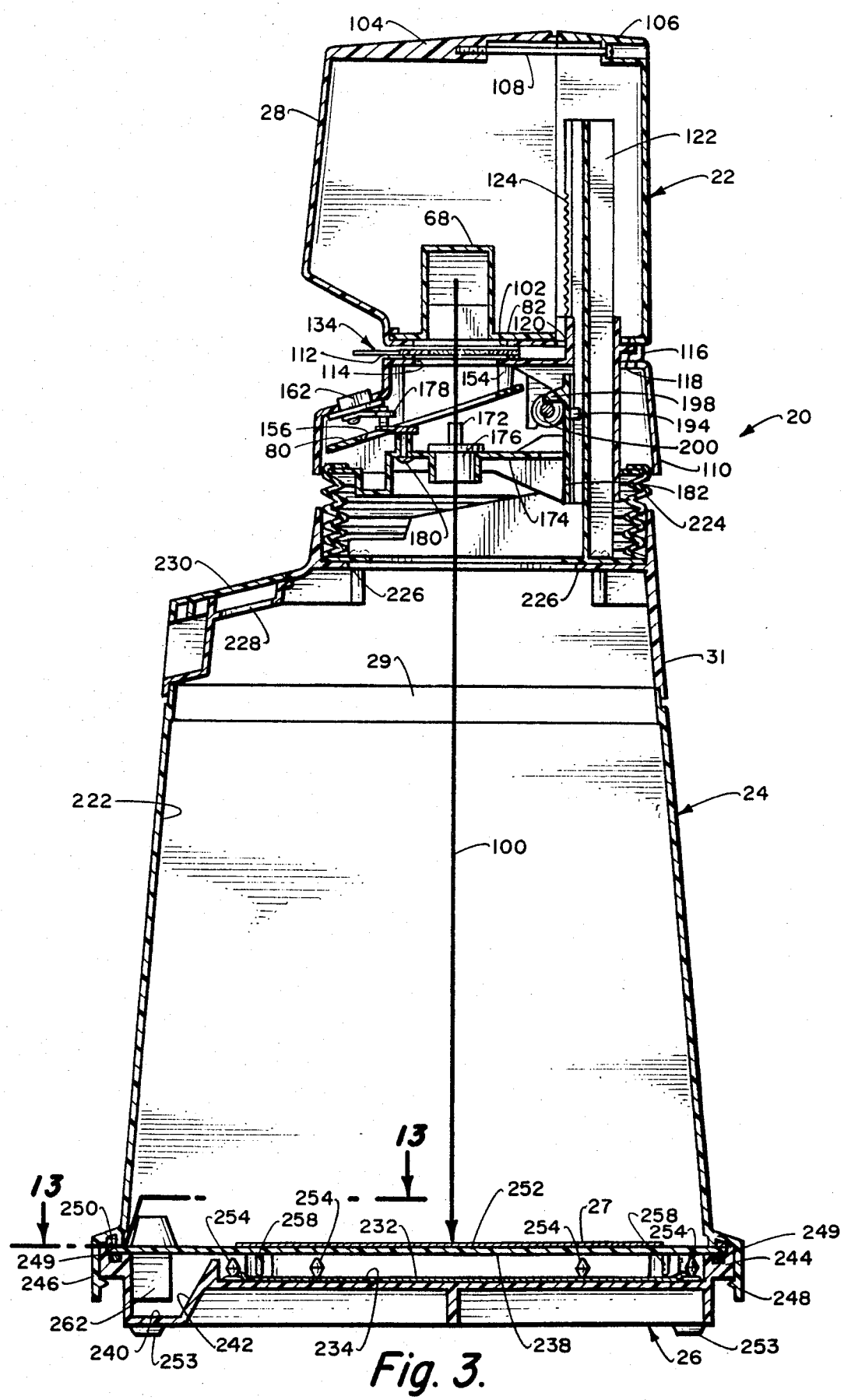
FIG. 3 is a cross-sectional view through the combined enlarger and print developing tray taken along line 3—3 of FIG. 1.
Figure 4:
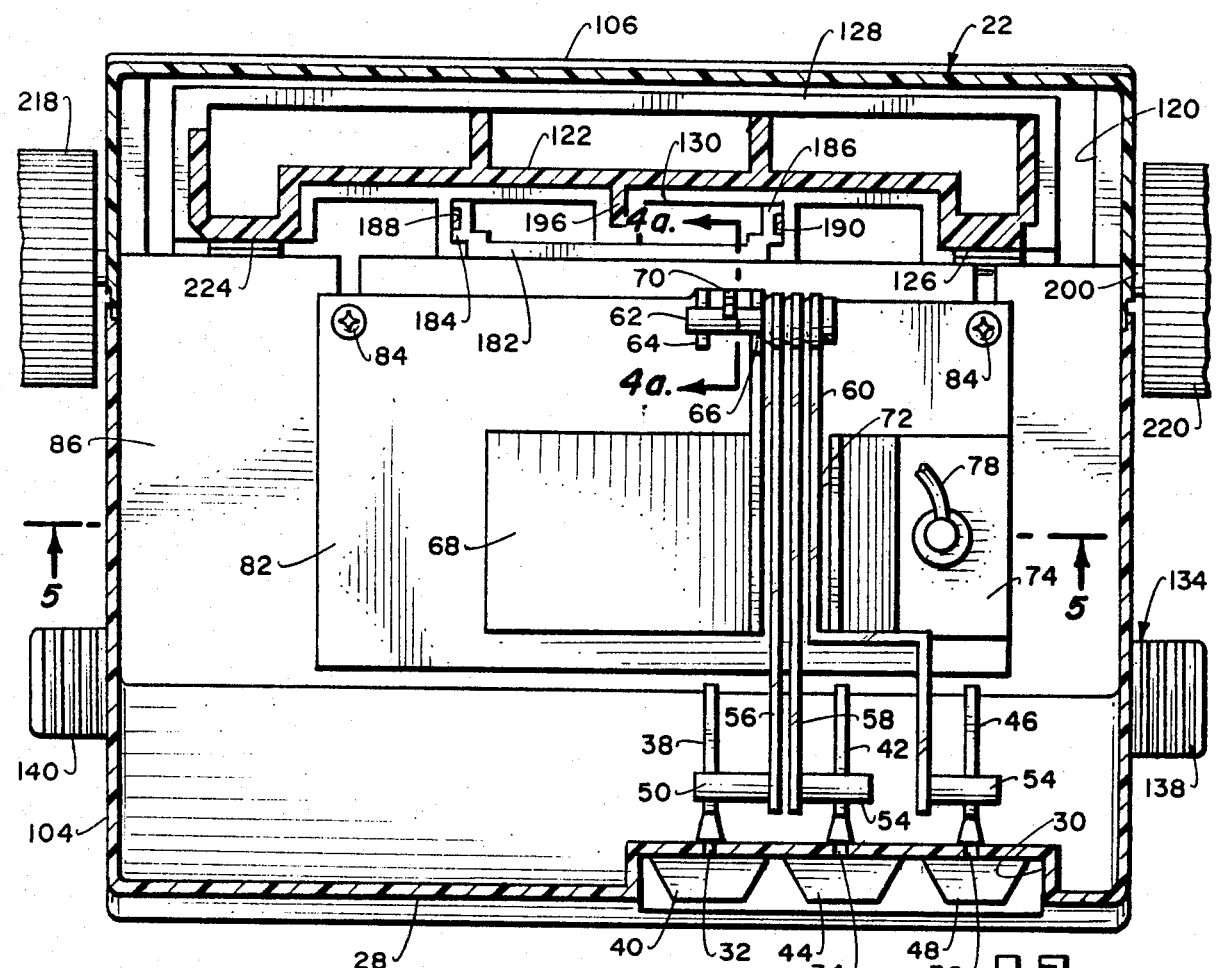
FIG. 4 is a cross-sectional view through the slide housing of the combined enlarger and print developing tray of the present invention taken along line 4—4 of FIG. 1.
Figure 4A:
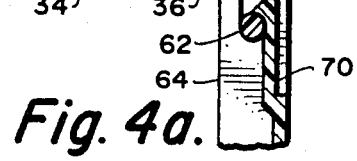
FIG. 4A shows the latching assembly for the light filter assembly utilized in conjunction with this invention taken along line 4a—4a of FIG. 4.
Figure 5:
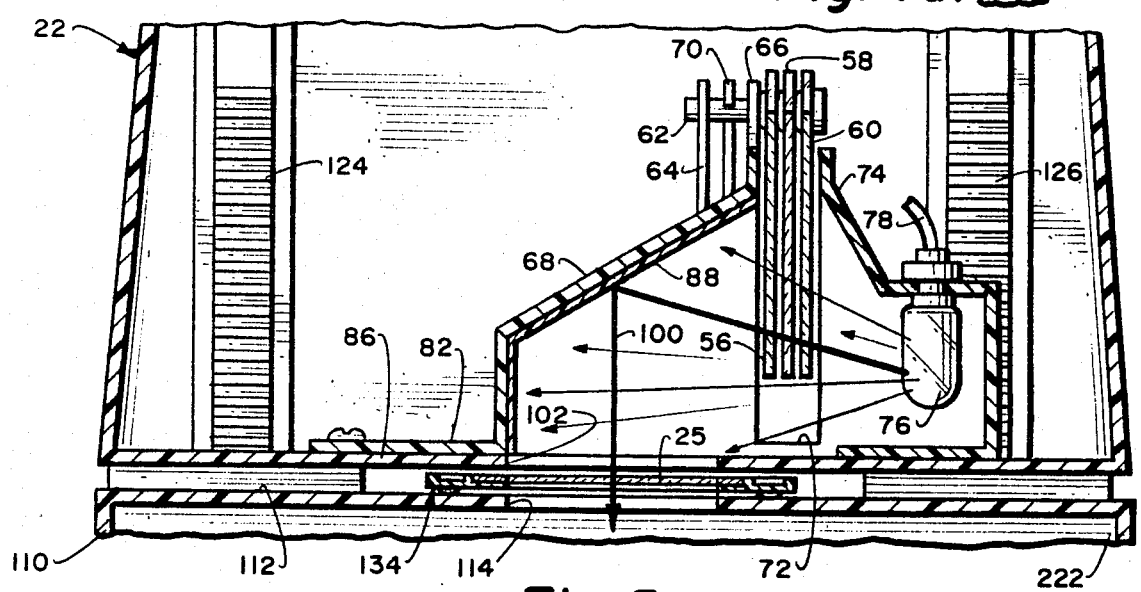
FIG. 5 is an enlarged segmental cross-sectional view taken along line 5—5 of FIG. 4 showing in detail the light source and filter assembly used in conjunction with the combined enlarger and print developing tray of the present invention.

It is to be noted that in referring to FIGS. 2 and 3 of the drawings, the slide housing 22 is formed of two separate sections wich can be generally referred to as a frontal section 104 and a rearward section 106. The sections 104 and 106 are normally secured together by a conventional fastening means which is shown to be bolt 108.

The frontal section 104 is also secured by fasteners 84 to the lens housing 110. The upper surface of the lens housing 110 is constructed so that there is formed a space 112 which is open at the front and at the sides. The space 112 is to function as a slide receiving station, the purpose of which will be explained further on in the specification. The space 112 extends across opening 102. It is to be noted that there is an opening 114 formed within the lens housing 110, which is in alignment with the opening 102.

The rearward section 106 has, at its lower surface, a pair of spaced apart protruding tabs 116 (only one in number being shown). Each tab 116 is to extend within a hole 118 formed within the lens housing 110. The tabs 116 function to tightly locate in place the lower edge of the rearward section 106 to the lens housing 110. by interlocking such together through the use of the tabs 116. It is to be understood that upon release of the bolt 108, the rearward section 106 can be pivoted rearwardly to the point that each of the tabs 116 will disengage from their respective holes 118 thereby permitting disengagement of the rearward section 106 for purposes of obtaining access into the interior of the slide housing 22. It is to be noted that, for purposes of description, the lens housing 110 is considered to be, in part, part of the overall slide housing 22.

Formed within the lower edge of the rearward section 106 is an enlarged opening 120. Located through the opening 120 and extending approximately three fourths of the distance of the height of the rearward section 106 is a rack gear housing 122. The rack gear housing 122 is fixed attached to the base 24. The rack gear housing 122 includes a pair of spaced-apart rack gears 124 and 126.

Located about the rack gear housing 122 in a close fitting, but yet slidable manner, is a portion of the lens housing which is constructed of a rear member 128 and a front member 130. Both the rear member 128 and the front member 130 are integrally attached to the lens housing 110.

Extending rearwardly of the member 128 are a pair of supporting flanges 132 (only one being shown). The lower surface of the rear section 106 is to rest on top of the flange 132, with the outer portion of the flange 132 to be located directly against the tab 116.

There is to be slidingly located within the space 112, a slide holder 134. The slide holder 134 has a centrally located frame 136. Extending from opposite sides of the frame 136 are handles 138 and 140. The handles 138 and 140 are to facilitate manual grasping and movement of the slide holder 136.

Located within the confines of the top surface of the frame 136 is a square pocket 142. The lower surface of the pocket 142 is formed into an inwardly extending flange wall 144. A conventional photographic transparency 25, which is normally encased within a frame (usually constructed of paper), is to be located within the pocket 142. The depth of the pocket 142 is selected to accommodate any convenient photographic transparency frame thickness, such as between 0.04 inches to 0.125 inches. With the photographic transparency 25 located within the pocket 142 and the slide holder 134 located within the slide receiving station 112, the light path 100 is to pass through opening 102, opening 146 formed interiorly of the flange wall 144 and then through the opening 114. The reason for the handles 138 and 140 is so that the slide holder 134 can be adjusted for front to back and side to side movement in order to permit cropping of the photographic transparency 25, whose image is being conducted through the opening 146. This cropping is done visually by the user, which will be made apparent further on in the specification.

Referring particularly to FIGS. 18 and 19 of the drawings, the bottom surface of the frame 136 includes a transverse shallow channel 148. Extending from the side wall of the frame 136 to within the confines of the channel 148 are a plurality of ears 150. The undersurface of each ear 150 is spaced from the planar bottom surface of the channel 148. A film strip 152 is to be located against the bottom surface of the channel 148, with the side edges of the film strip 152 located under the ears 150. The film strip 152 is then retained in position within the slide holder 134. The film strip 152 will normally comprise a movie film, with there being a plurality of photographic transparencies located within the strip 152. A single photographic transparency 25 within the strip 152 is to be centrally disposed over the opening 146 and it is this photographic transparency which will be reproduced into a photographic print.

The printed circuit board 80 is mounted by a plurality of mounting plugs 154 to the interior surface of the lens housing 110. In order to not interfere with the light path 100, there is an opening 156 formed within the printed circuit board 80. The function of the printed circuit board 80 is to control the time duration of the light that is emitted from the bulb 76.

Mounted within a portion of the exterior surface of the lens housing 110 are a series of controls which are denoted as button 158, control knob 160, slidable knobs 162 and 164. The button 158, when depressed, activates appropriate circuitry within the printed circuit board 80 to activate the bulb 76. The time duration of the bulb 76 depends upon the position of the knob 160. If the knob 160 is set at a higher number, the time light that is emitted from the bulb 76 will be longer than if the knob 160 is set at a lower number.

The slidable knob 164 is to be setable at one of three in number of different locations so as to compensate for the exposure value for the particular photographic film that is used. The knob 160 works in conjunction with the light sensor that senses the amount of light that is being emitted through the photographic transparency. The inter-relationship between the knobs 160 and 164 is that with the knob 160 set for a predetermined exposure for a particular type of film and the film then changed to another type of film, it is necessary for knob 164 to be moved to the particular setting for the new type of film, with knob 160 remaining in its established position and the same amount of exposure being obtained.

Figure 12:
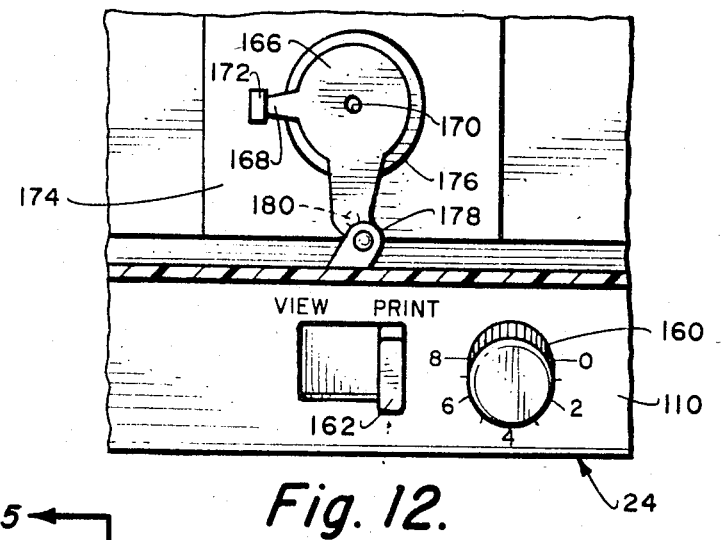
FIG. 12 is a view showing the lens cover in the print exposing position utilized in conjunction with the lens assembly incorporated within the apparatus of the present invention.
Figure 13:
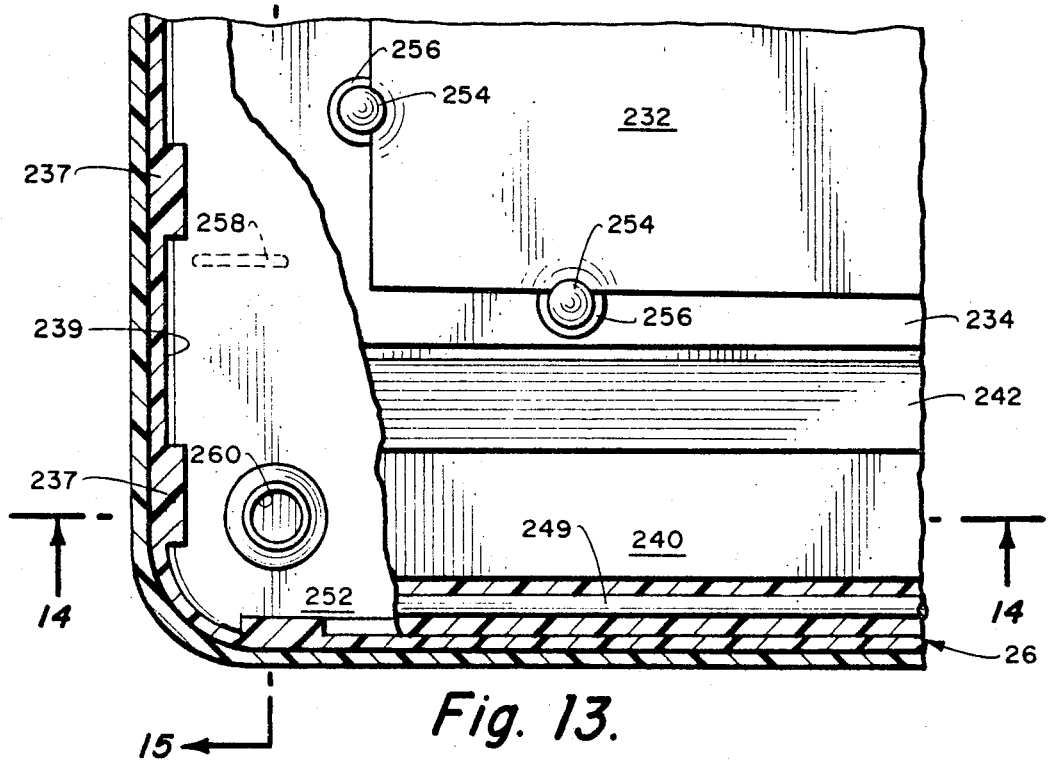
FIG. 13 is a top, plan view of a portion of the print developing tray utilized in conjunction with the apparatus of the present invention taken along line 13—13 of FIG. 3.
Figure 14:
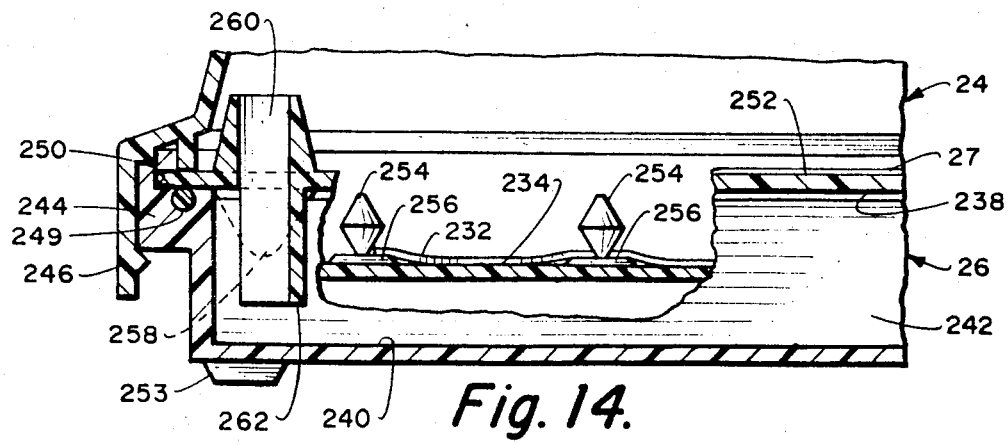
FIG. 14 is a cross-sectional view taken along line 14—14 of FIG. 13.
Figure 16:
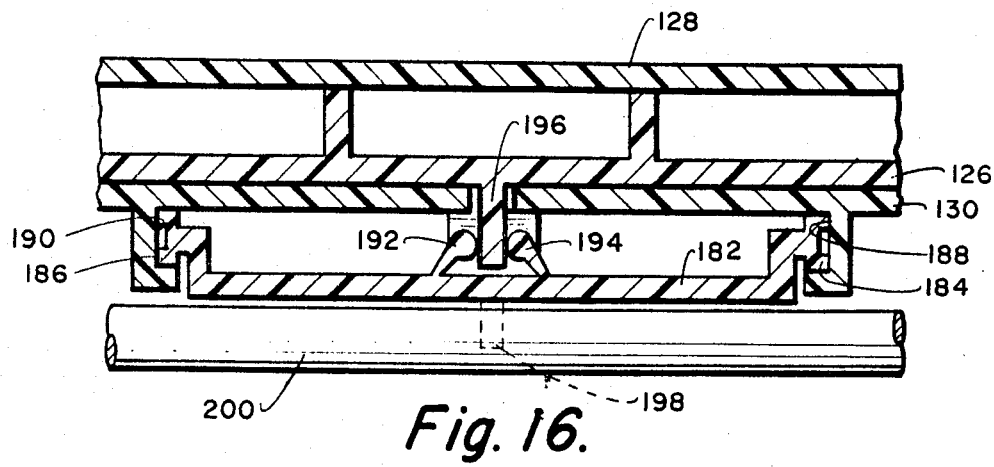
FIG. 16 is a cross-sectional view taken along line 16—16 of FIG. 11 showing the frictional drag utilized in conjunction with apparatus of this invention to resist the movement between the slide housing and the base.
Figure 17:
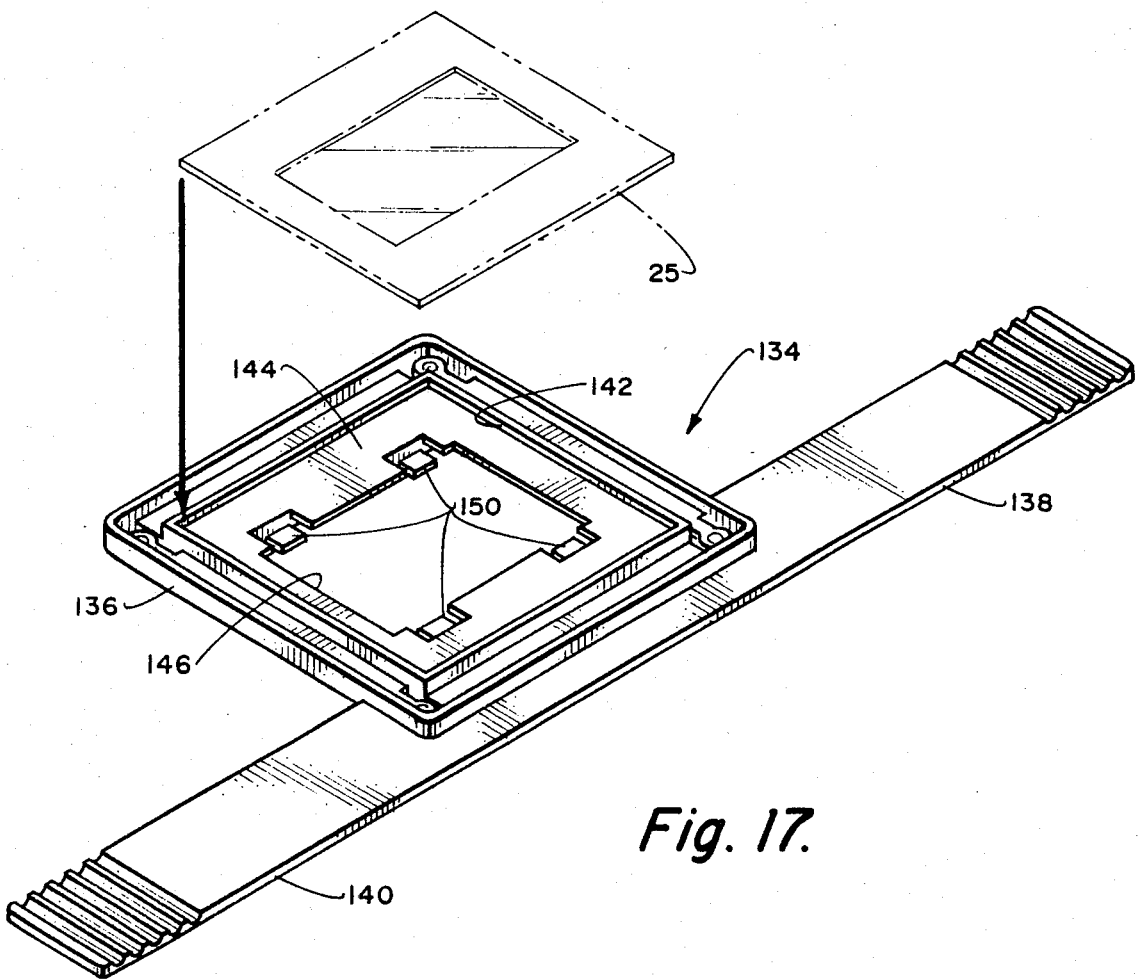
FIG. 17 is a top, isometric view of the slide holder utilized in conjunction with the apparatus of the present invention showing the pocket which is to connect with a conventional framed photographic transparency.
Figure 20:
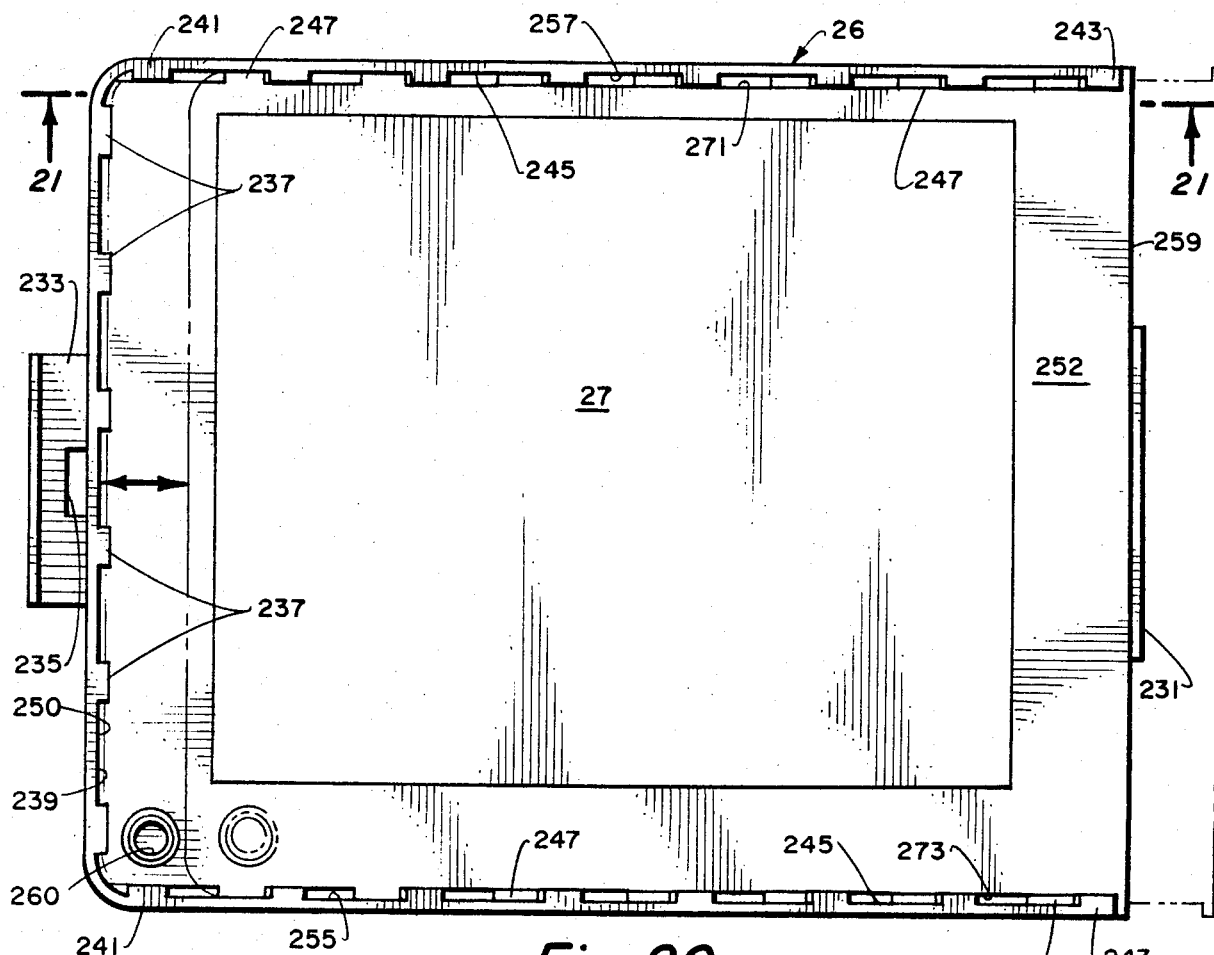
FIG. 20 is a top plan view of the print developing tray of this invention showing the cover closed preventing exposure of the film to be contained therein.
Figure 21:
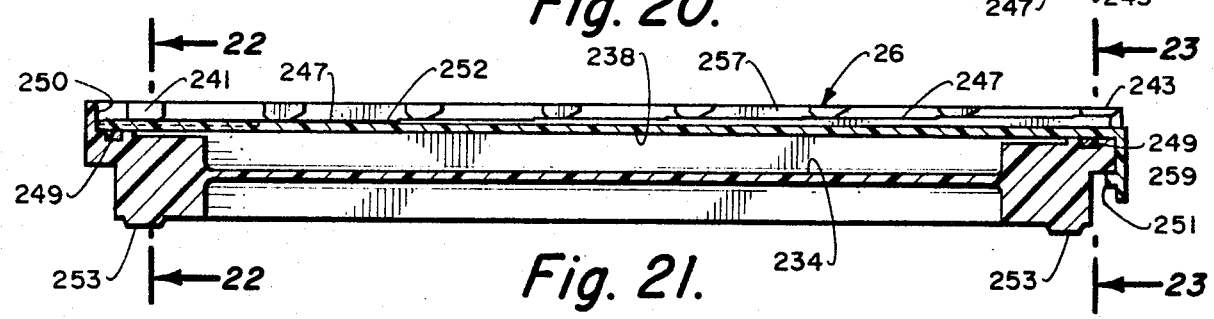
FIG. 21 is a cross-sectional view taken along ling 21—21 of FIG. 20.
Figures 22, 23:
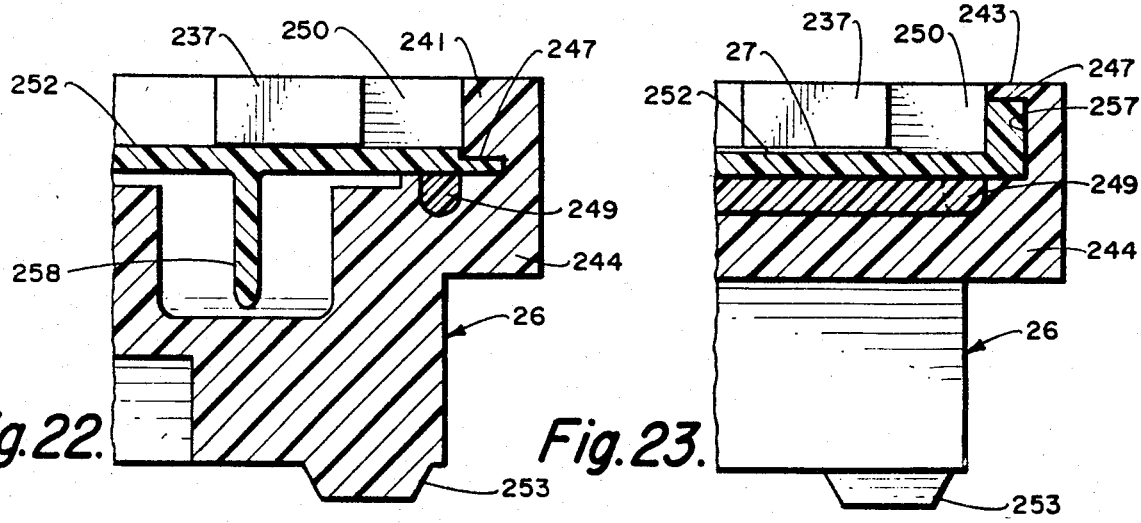
FIG. 22 is a partial cross-sectional view taken along line 22—22 of FIG. 21.
FIG. 23 is a partial cross-sectional view taken along line 23—23 of FIG. 21.

There is to be a manual viewing (to be described further on in the specification) of the image prior to exposing of the photographic print. During this manual viewing, it is desirable that a maximum amount of light be transmitted to the viewing area. In order to achieve this, a shutter 166 is displaced from the light path to not interfere with this manual viewing. The shutter 166 normally comprising a fixed-aperture plate includes an extension 168 and a centrally located aperture 170. With the outer end of the extension 168 in contact with a stop 172, which in turn is fixedly mounted on horizontal wall 174, the shutter 166 will be located directly over the lens assembly 176. As a result, light from the bulb 76 can only be transmitted through the aperture 170, which makes the transmission of light substantially restricted. However, this type of light transmission is necessary during the reproducing of the photographic print. To locate the shutter 166 in this reproducing position, the knob 162 is slid to the print position, as shown in FIG. 12 of the drawings, which causes link 178 to pivot the shutter 166 about a pivot pin 180.

Figure 6:
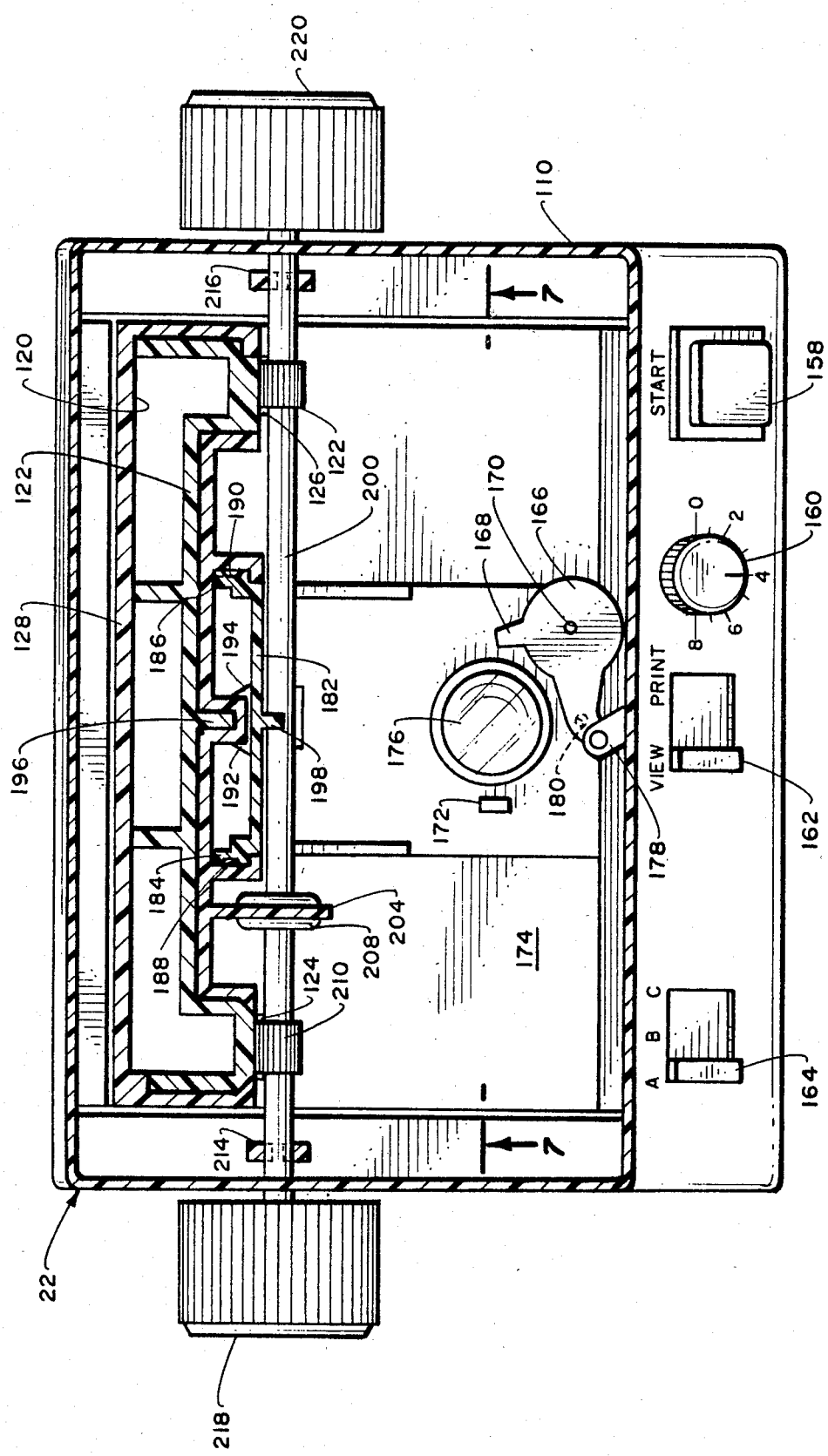
FIG. 6 is a cross-sectional view taken along line 6—6 of FIG. 1 showing in detail the mechanism utilized to affect movement of the slide housing in respect to the base upon which it is mounted.

When it is desired to locate the shutter 166 spaced from the lens assembly 176 as shown in FIG. 6 of the drawings, the knob 162 is moved to the view position, which will cause the link 178 to pivot the shutter 166 about the pivot pin 180 to the desired displaced position.

The lens assembly 176 is fixedly mounted within the wall 174 and is centrally disposed with respect to the path 100. The member 174 is mounted on a vertical wall assembly 182. The vertical wall assembly 182 includes a pair of guide rails 184 and 186. The guide rail 184 fits within a guide track 188. The guide rail 186 fits within a guide track 190. The function of the rails 184 and 186 and their respective tracks 188 and 190 permit only movement of the vertical wall assembly 182 with respect to the rack gear housing 122 along the direction of the path 100.

Centrally disposed between the tracks 188 and 190 are a pair of facing fingers 192 and 194. The fingers 192 and 194 are biased into snug contact with an elongated rail 196. The fingers 192 and 194 are to prevent free movement between assembly 182 and front member 130. Only upon a sufficient force being exerted tending to move vertical wall assembly 182 in respect to the front member 130 will movement occur therebetween.

Extending forwardly of the vertical wall assembly 182 is a contact protuberance 198. The protuberance 198 rests on shaft 200. It is to be noted that because of the rails 184 and 186, which fit within the tracks 188 and 190, that sliding movement is to occur between vertical wall assembly 182 and front member 130. However, this movement is very limited and actually, in most instances, will not exceed three tenths of an inch. Movement in the other direction is limited by the interior wall of the lens housing 110 coming into contact with the free upper end 202 of the vertical wall assembly 182.

Integrally attached to the front member 130 and extending therefrom is a plate 204. The plate 204 includes a recess 206. A grommet 208 is fixedly attached onto the shaft 200. The grommet 208 has a annular groove. The annular groove and the grommet 208 are to be located within the recess 206, with the plate 204 located within the annular groove. The function of the grommet 208 is to function as a frictional resistance to resist turning movement of the shaft 200. Turning movement of the shaft 200 is permitted but when released the frictional drag of the grommet 208 with respect to the plate 204 will prevent further movement.

Fixedly mounted on the shaft 200 in a spaced-apart relationship are pinion gears 210 and 212. The gear 210 connects with the rack gear 124, with the gear 212 connecting with the rack gear 126. The shaft 200 is supported at each end thereof by bifurcated clips 214 and 216 which are integrally attached and extend from the front member 130.

With reference to FIG. 2 of the drawings, rotation of the shaft 200 in the clockwise direction in reference to FIG. 2 of the drawings, will cause vertical wall assembly 182 to move so that upper end 202 contacts the interior wall surface of the lens housing 110. Further rotation of the shaft 200, which is produced by rotating the knobs 218 and 220 mounted at each end of the shaft 200, will cause the entire slide housing 22 to be moved relative to the rack gear housing 122 and, similarly, movement of the slide housing 22 relative to both the primary base 31 and the secondary base 24. During this movement, in order to insure a light tight connection between the primary base 31 and the secondary base 24, (preventing light from entering to within the inner chamber 222 of the secondary base 24) there is utilized a flexible walled bellows 224. The bellows 224 is mounted at its upper end onto wall 174 and at its lower end onto flange 226. The flange 226 extends from the interior wall of the primary base 31. It is to be noted that the rack gear housing 122 is also mounted on the flange 226.

The front upper section of the primary base 31 includes a ledge which includes a view port 228. The function of the view port 228 is to facitate manual observing in a direction toward the bottom of the secondary base 24. The observing through the view port 228 is accomplished with lid 230 being pivoted to the dotted line position shown in FIG. 2 of the drawings. The lid 230 is pivotally connected at its edges to the primary base 31. When the view port 220 is no longer necessary, the operator merely takes the lid 230 and pivots it over the port 228 preventing ambient light from entering into the inner chamber 222. The basic shape of secondary base 24 is that of a truncated pyramid. However, the shape is deemed to be a matter of choice.

The entire purpose of the apparatus 20 of this invention is to make a photographic print from a photographic transparency which is mounted in conjunction with slide holder 134. The unexposed photographic print paper 232 is located on a planar surface 234 which is formed within the tray assembly 26. The planar surface 234 is part of an interior chamber 238 formed within the tray 26. The interior chamber 238 also includes an elongated channel 240 which is located at one end of the tray 26. The channel 240 is located at a slightly lower level than the surface 234 and is separated therefrom by upstanding wall 242. A quantity of developing liquid (not shown) is to be located within the channel 240. Tipping of the tray 26 is to cause the developing liquid to move over the wall 242 and to come into contact with the planar surface 234 and hence the unexposed film 232. In this manner, development of the film 232 is to occur. The exterior portion of the tray 26 is to include a flange 244. This flange 244 is connectable to the lower portion of the secondary base 24 by means of latches 246 and 248. It is to be understood that the tray 26 can be readily removed from the secondary base 24 when such is desired, such as after exposure of the film 232.

At the inner end of the inner surface of the flange 244 there is a groove 250. The facing sides of the flange 244 are formed into side grooves 255 and 257. Within the grooves 250, 255 and 257 there is to be located the periphery of a cover 252. The cover 252 is to be slidable within the grooves 250, 255 and 257 between a position completely covering the unexposed film 232, and preventing light from entering the interior chamber 238, to a retracted position which will permit light to come into contact with the exposed film 232. The film 232 is to be loaded within a tray 26 in a darkened environment. This loading of the film 232 on the planar surface 234 is accomplished by locating the film between hold-down pins 254.

There are a plurality of the hold-down pins 254 located in a spaced-apart manner mounted on the planar surface 234 directly adjacent the periphery of the film 232. Each pin 254 has an enlarged center section and a base 256. The operator first locates the film 232 in the area defined by the pins 254. The operator then physically pushes the film 232 so that the edges of the film 232 will pass by the enlarged center section of each of the pins 254 and come into contact with the base 256. The slight raising of the base 256 is not sufficient to affect the quality of the produced print. Actually, when using some developing solutions, the raising of the base 256 is desirable to provide flow channels for the solution to come into contact with the undersurface of the print. With the film so located in the space defined between the pins 254, the film 232 is in its proper position.

Since the locating of the film 232 is accomplished in a darkened environment, there is always the possibility that one edge of the film 232 did not get properly located past the enlarged center surface of a pin 254. Prior to leaving of the darkened environment, the operator moves the cover 252 to the closed position. Attached to the inner surface of the cover 252 are a plurality of ribs 258. It is to be noted that in referring to the drawings, there is only shown a single rib 258. However, a rib 258 is to be located adjacent each longitudinal side of the film 232. Each rib 258 extends to almost come into contact with the upper surface of the unexposed film 232. During movement of the cover 252 to the closed position, the rib 258 will run along the upper surface of the film 232. If an edge of the film 232 is not directly against the planar surface 234, the rib 258 will cause such to occur. Therefore, the rib 258 functions to further insure accurate placement of the film 232.

Also included within the cover 252 is a liquid entry opening 260. The developing fluid 260 is to be inserted through the opening 260 to within the channel 240. Extending within the confines of the channel 240 and attached to the undersurface of the cover 252 directly adjacent the opening 260 is a light baffle and splash guard 262. The function of the splash guard 262 is to prevent accidental splashing of any of the developing fluid onto the film 232 to prevent premature development of the film 232 in spots. The splash guard 262 also functions in conjunction with wall 242 to prevent entry of any light into the area of film 262. It is to be noted that the cover 252, when in the retracted position, leaves the film 232 in a position to be totally exposed by the light path 100.

Not only is it desirable that the interior chamber 238 be light-tight with cover 252 installed, but it is also desirable to have the chamber 238 to be liquid-tight to contain the developing fluid. To achieve this, the upper ledge of flange 244 includes an O-ring seal 249 which is to be tightly pressed into contact with the lower surface of the cover 252. Also, it is desirable to have the cover 252 slide easily to its closed position. Therefore, the seal 249 is to be compressed only at the instant the cover 252 reaches the fully installed position.

This seal compression is obtained in the following manner: inner locking tabs 241 (one associated with groove 255 and one associated with groove 257) are substantially thicker than similar outer locking tabs 243. This results in the side grooves 255 and 257 being substantially more narrow at their inner edge than at their outer edge. The locking tabs located between each pair of tabs 241 and 243 steadily increase in depth from tabs 243 to 241.

A stepped configuration 247 is formed on both sidewalls of cover 252, with the largest steps being at the outer edge of cover 252. During closing movement of cover 252, there is excessive space in the grooves 255 and 257 until the cover 252 is fully installed. At that time, all the locking tabs exert pressure against both stepped configurations which in turn slightly deforms seal 249 forming a liquid-tight connection between cover 252 and flange 244. The inner edge of cover 252 is located below locking tabs 237. Cut-out areas 239 are located between tabs 237 to decrease the amount of material used in manufacture. Similarly, there are cut-out areas 245 between tabs 241 and 243. However, the cut-out areas 245 also function to permit locating of the cover 252 with flange 244 other than at the fully retracted position. This is permitted since there are similar cut-out areas 271 and 273 formed within side edges of cover 252. In the fully closed position, the outer edge 259 of the cover 252 is to abut flange 244. In this position, locking flange 251 is snugly located beneath flange 244.

To facilitate installing and removing of cover 252, there is mounted on flange 244 a tray handle 233 and a cover handle 231 mounted on cover 252. A hole 235 is formed in handle 233. Located on the bottom of the tray 26 are foot pads 253 to facilitate supporting of the apparatus 20 on a table or other supportive surface.

The operation of the apparatus of the present invention is as follows: The operator selects the particular transparency that the operator wishes to duplicate. If the transparency is what is termed a slide 25, the operator locates such within the pocket 142. If the transparency is part of the film strip 152, the operator then attaches the film strip to the bottom surface of the slide holder 134 at the desired position. The operator then proceeds to locate the slide holder 134 within the slide receiving station represented by space 112.

It is to be understood that the operator has previously loaded tray assembly 26 with the photographic print 232. This loading, as previously mentioned, has been accomplished in a darkened environment. The loading is physically accomplished by means of sliding the cover 252 to the retracted position and the operator placing the unexposed print 232 with the sensitive side up on the planar surface 234. The print 232 is located in the area defined by the pins 254. The edge of the print 232 is physically moved past the enlarged center of each of the pins 254 so that the print 232 will lay substantially flat on the surface 234. The operator then moves the cover 252 to the closed position completely closing the interior chamber 238. The operator is then free to move from the darkened environment and locate the tray assembly in its proper position onto the lower end of the secondary base 24 by means of latches 246 and 248.

The operator then moves sliding knob 162 to the view position which causes the shutter 166 to be displaced from the lens assembly 176. Simultaneously with the moving of the knob 162 to the view position, the light bulb 76 is activated. At this particular time, it would be normal for the knobs 40, 44 and 48 to be moved to the upper end of their respective elongated apertures 32, 34 and 36 so that each of the filters 56, 58 and 60 are not intersecting the light path.

The operator opens the view port 228 by moving the lid 230 to the open position. The operator then is able to observe the image of the transparency 25 on the focusing target 27 which has been located on the exterior or outer surface of the cover 252. The operator adjusts the position of the slide holder 134 by grasping the handles 138 and 140 until the desired approximate position is obtained of the image of the transparency on the focusing target 27.

The operator then rotates knobs 218 and 220 which causes the slide housing 22 to move away from the base 24. This will cause the projected image from the focusing target 27 to enlarge. This movement of the slide housing 22 is continued until the desired amount of enlargement is obtained of the projected image. Once the desired amount of enlargement has been obtained, a final adjusting focus is to occur. The operator achieves this by "backing off" or turning of the knobs 218 and 220 slightly in the opposite direction. This opposite direction is within a limited space which is defined as the distance between the interior of the lens housing 110 and the upper end 202 of the vertical wall assembly 182. During this focusing, the lens 176 will remain fixed in the position established prior to "backing off" of knobs 218 and 220, with the slide housing 22 and the lens housing 110 being moved. It is to be noted that both the magnification and the focus is obtained through a single operating means, that being the knobs 218 and 220. This arrangement is most convenient from a usage standpoint.

Upon the desired focus now being obtained, the operator will normally make a final adjustment as to the exact position of the transparency cropping out any portion that may be undesirable. In observing of the image, if the color is not exactly what would be preferred, the color can be changed by the moving of the knobs 40, 44 and 48 so as to locate any one, two or all three of the filters 56, 58 and 60 within the light path. Also, any one of the filters 56, 58 and 60 could be only partially located across the light path 100. The produced color intensity of the partially located filter than varies. It is to be noted that due to the mixing obtained by the coating 88, the color intensity of the partially positioned filter is evenly distributed across the image.

At this particular time, the operator should be able to observe what will be the best possible projected image from the transparency 25. The operator then moves lid 230 to the closed position which prevents ambient light from entering view port 228. The operator then moves slide knob 162 to the print position which, at this particular instant, turns off the bulb 76. The operator will now set the knob 164 for the particular type of film 232 that is being used. Also, the operator will turn knob 160 for what is believed to be the desired amount of exposure time per an instruction manual. The operator then moves cover 252 to the totally retracted position. The operator then pushes button 158 which will cause light to be emitted from the bulb 76 a measured amount of time to produce the most satisfactory exposure of the film 232.

Figure 24:
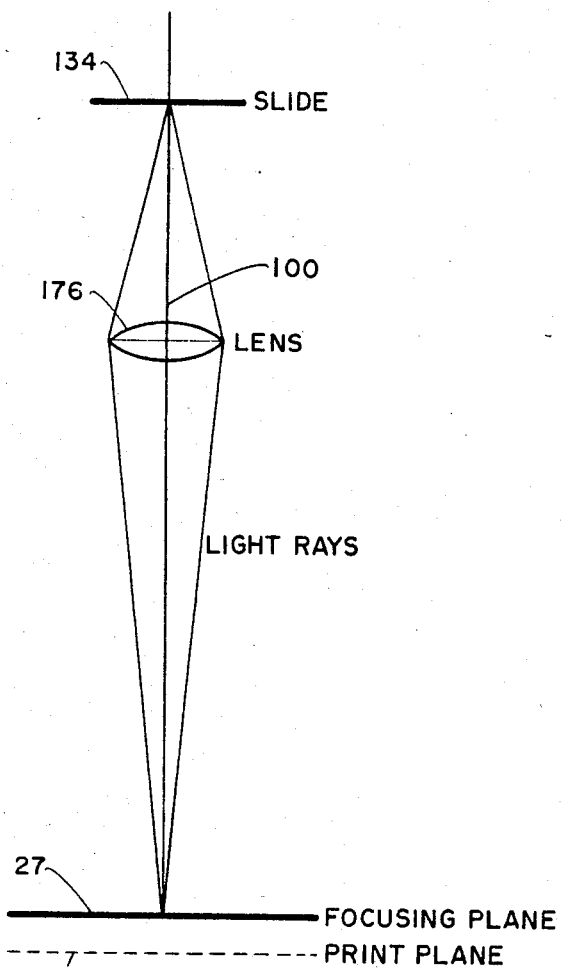
FIGS. 24 and 25 are diagrammatic views depicting the focus shift utilized in this invention.
Figure 25:
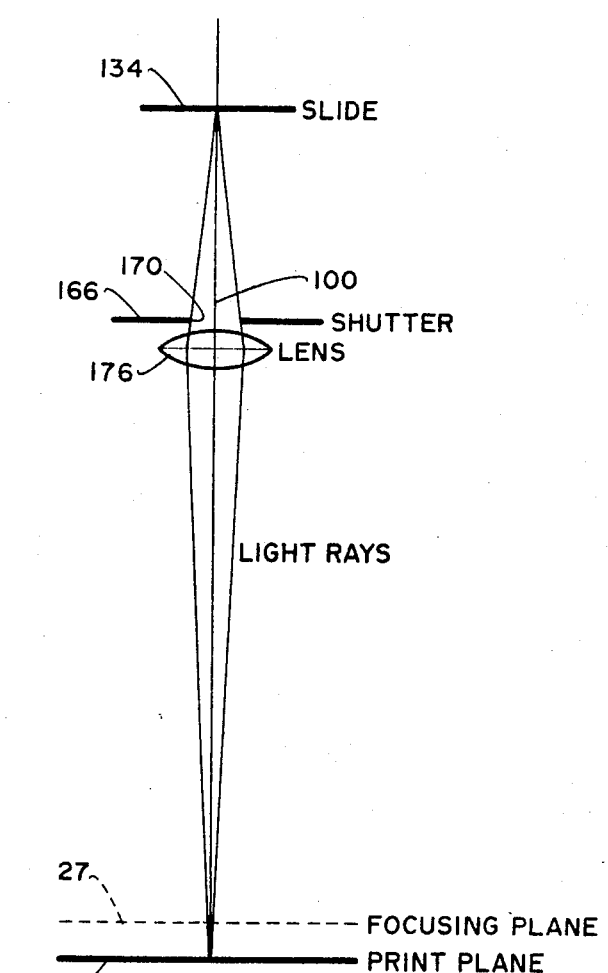

It is to be noted that there is a spacing (approximately one-half an inch) of the image on the focusing target 27 to the print 232. This would normally result in a slight deterioration of the focus when making the print 232 versus the focus that was established on the target 27. However, to compensate for this, the lens 176 is constructed optically to have a shift in focus. This shift occurs automatically when moving from the wide light beam (used in the view position) shown in FIG. 24 to the narrow light beam (used in the print position) shown in FIG. 25. The narrow light beam occurs when shutter 166 covers the lens 176 with light only passing through aperture 170. This constructing of a lens to have a shift is conventional.

After the desired exposure has been obtained, the operator then moves the cover 252 to the closed position completely covering the print 232. The operator then removes the tray assembly 26 from the base 24. The operator then inserts the desired amount of developing fluid through the aperture 260 into the channel 242. The operator then tilts the tray assembly 26 causing the developing fluid to be conducted past light baffle or splash guard 262 and over wall 242 to pour onto the print paper 232. The developing liquid is to remain on the print paper 232 for the desired amount of time, which is generally a few minutes. The operator then tilts the tray assembly 26 until the liquid drains from the print 232 back into the channel 240. The developing fluid which is located within the channel 240 will be removed from the tray and located within a storage container (not shown). The operator then moves the cover 252 to the retracted position and removes the print 232 and locates such to dry. The apparatus 20 is now ready to be reused.

Figure 26:
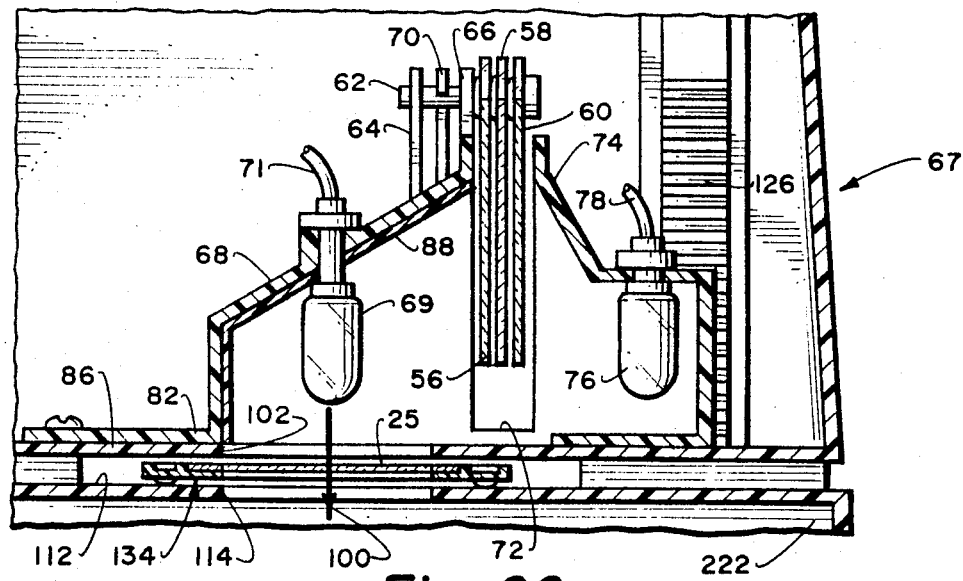
FIG. 26 is a cross-sectional view similar to FIG. 5 of a modified form of this invention using two bulbs instead of a single bulb.

Referring particularly to FIG. 26, there is shown a modified version 67 of this invention. This modification utilizes an additional bulb 69 in addition to bulb 76. The bulb 69 is connected to the printed circuit board 80 by conductor 71. Bulb 69 is mounted within wall 68 directly along path 100. Bulb 69 is to be used only for viewing and bulb 76 only for exposing of film 232. In this instance, the setting of the position of the filters 56, 58 and 60 will be by following an instruction manual and not by direct viewing.

It is to be noted that although the apparatus 20 of this invention has been described in regard to producing an enlarged print, such as a five inch by seven inch or an eight inch by ten inch, it is considered to be within the scope of the invention that a different height of secondary base 24 could be utilized to produce a conventionally sized picture, such as self-developing film which is currently manufactured by Poloroid and Kodak Corporations. In such an instance, the pack of film will be mounted within a tray assembly (not shown) which is specially configured to hold such a pack of film.

What is claimed is:

1. A combined photographic enlarger and print developing tray comprising:
    a slide housing, a light source mounted within said slide housing, said light source emitting light along a specific path, a slide receiving station formed within said slide housing;
    a slide holder, said slide holder having an opening within which there is adapted to be located a photographic transparency, said slide holder to be located in a close fitting relationship with said slide receiving station, said opening to intersect said specific path, said slide holder and said opening being adjustable relative to said path and fixable in an established position;
    a primary base;
    a lens housing fixed to said slide housing, a lens mounted on said lens housing, said lens intersecting said specific path, said lens housing being connected by connecting means to said primary base, said connecting means permitting movement along said specific path of said slide housing in respect to said primary base;
    a secondary base having an enlarged internal chamber, said secondary base having a top and a bottom which are interconnected by a side wall assembly, said primary base being connected by interlocking means to said secondary base at said top,
    a view port formed within said primary base, said view port being spaced from said specific path;
    a print tray assembly connected to said secondary base at said bottom, said print tray assembly having print receiving means, said print receiving means adapted to contain an unexposed photographic print which is to intersect said specific path, a panel normally covering said print receiving means to prevent premature exposure of the print, said panel having a focusing target, said focusing target accurately representing the size and position of the photographic print, said panel being movable between a first position covering said print receiving means to a second position permitting access to said print receiving means, said second position being spaced further from said lens than said first position, whereby a user can observe through said view port to magnify and focus the desirable image of the photographic transparency on said focusing target by moving of said slide housing relative to said base and then by physically moving of said slide holder select the desired position of the photographic transparency to achieve the desired photographic print and then removing said panel and then activating said light source to expose the photographic print; and
    when using said view port said lens being unrestricted to pass the maximum amount of light therethrough producing a clear image on said focusing target with said panel in said first position, said lens being restricted during passing of light therethrough to expose the photographic print with said panel in said second position causing an automatic shift in focus producing a clear image on the photograph print.

2. The combined photographic enlarger and print developing tray as defined in claim 1 including:
    a color filter assembly mounted within said slide housing, said color filter assembly intersecting said specific path.

3. The combined photographic enlarger and print developing tray as defined in claim 2 wherein:
    said color filter assembly comprising a plurality of separate color filters, each said color filter being individually movable between positions intersecting said specific path and not intersecting said specific path.

4. A combined photographic enlarger and print developing tray comprising:
    a slide housing, a light source mounted within said slide housing, said light source emitting light along a specific path, a slide receiving station formed within said slide housing;
    a slide holder, said slide holder having an opening within which there is adapted to be located a photographic transparency, said slide holder to be located in a close fitting relationship with said slide receiving station, said opening to intersect said specific path, said slide holder and said opening being adjustable relative to said path and fixable in an established position;
    a primary base;
    a lens housing fixed to said slide housing, a lens mounted on said lens housing, said lens intersecting said specific path, said lens housing being connected by connecting means to said primary base, said connecting means permitting movement along said specific path of said slide housing in respect to said primary base;

a secondary base having an enlarged internal chamber, said secondary base having a top and a bottom which are interconnected by a side wall assembly, said primary base being connected by interlocking means to said secondary base at said top, a view port formed within said primary base, said view port being spaced from said specific path;

a print tray assembly connected to said secondary base at said bottom, said print tray assembly having print receiving means, said print receiving means adapted to contain an unexposed photographic print which is to intersect said specific path, a panel normally covering said print receiving means to prevent premature exposure of the print, said panel having a focusing target, said focusing target accurately representing the size and position of the photographic print, whereby a user can observe through said view port to magnify and focus the desirable image of the photographic transparency on said focusing target by moving of said slide housing relative to said base and then by physically moving of said slide holder select the desired position of the photographic transparency to achieve the desired photographic print and then removing said panel and then activating said light source to expose the photographic print; and said slide holder having an upper surface and a bottom surface, said upper surface including a pocket, said pocket being adapted to contain an individually framed photographic transparency, said bottom including strip connection means, said strip connection means to facilitate connection to a strip of film which contains a plurality of the photographic transparencies.

5. The combined photographic enlarger and print developing tray as defined in claim 1 wherein:
said connecting means including a gear assembly, said gear assembly including a rack and pinion gear arrangement.

6. The combined photographic enlarger and print developing tray as defined in claim 5 wherein:
said connecting means further includes a bellows.

7. The combined photographic enlarger and print developing tray as defined in claim 1 wherein:
said view port including a lid, said lid being movable to position to close said view port.

8. A combined photographic enlarger and print developing tray comprising:
a slide housing, a light source mounted within said slide housing, said light source emitting light along a specific path, a slide receiving station formed within said slide housing;

a slide holder, said slide holder having an opening within which there is adapted to be located a photographic transparency, said slide holder to be located in a close fitting relationship with said slide receiving station, said opening to intersect said specific path, said slide holder and said opening being adjustable relative to said path and fixable in an established position;

a primary base;

a lens housing fixed to said slide housing, a lens mounted on said lens housing, said lens intersecting said specific path, said lens housing being connected by connecting means to said primary base, said connecting means permitting movement along said specific path of said slide housing in respect to said primary base;

a secondary base having an enlarged internal chamber, said secondary base having a top and a bottom which are interconnected by a side wall assembly, said primary base being connected by interlocking means to said secondary base at said top, a view port formed within said primary base, said view port being spaced from said specific path;

a print tray assembly connected to said secondary base at said bottom, said print tray assembly having print receiving means, said print receiving means adapted to contain an unexposed photographic print which is to intersect said specific path, a panel normally covering said print receiving means to prevent premature exposure of the print, said panel having a focusing target, said focusing target accurately representing the size and position of the photographic print, whereby a user can observe through said view port to magnify and focus the desirable image of the photographic transparency on said focusing target by moving of said slide housing relative to said base and then by physically moving of said slide holder select the desired position of the photographic transparency to achieve the desired photographic print and then removing said panel and then activating said light source to expose the photographic print;

said panel being slidably engaged with said tray, said panel being slidable between a first position covering said print receiving means to a second position permitting access to said print receiving means; and a plurality of hold down pins being mounted on said print tray assembly and located within said print receiving means, said hold down pins being spaced apart and located about the periphery of said print receiving means, whereby said hold down pins are to function to hold in place the photographic print when such is located within said print receiving means.

9. The combined photographic enlarger and print developing tray as defined in claim 8 wherein:
said print receiving means including a planar surface, said tray including a groove assembly, said panel being slidably engaged with said groove assembly, said panel including a plurality of protuberances, movement of said panel from said second position to said first position covering the photographic print causes said protuberances to be conducted across the surface of the photographic print to insure that the photographic print is positioned substantially flat against said planar surface of said print receiving means.

10. The combined photographic enlarger and print developing tray as defined in claim 1 wherein:
said interlocking means comprising a necked-down section formed at said top of said base, said necked-down section interlockingly engaging with said lens housing.

11. A combined photographic enlarger and print developing tray comprising:
a slide housing, a light source mounted within said slide housing, said light source emitting light along a specific path, a slide receiving station formed within said slide housing;

a slide holder, said slide holder having an opening within which there is adapted to be located a photographic transparency, said slide holder to be located in a close fitting relationship with said slide receiving station, said opening to intersect said specific path, said slide holder and said opening being adjustable relative to said path and fixable in an established position;

a primary base;

a lens housing fixed to said slide housing, a lens mounted on said lens housing, said lens intersecting said specific path, said lens housing being connected by connecting means to said primary base, said connecting means permitting movement along said specific path of said slide housing in respect to said primary base;

a secondary base having an enlarged internal chamber, said secondary base having a top and a bottom which are interconnected by a side wall assembly, said primary base being connected by interlocking means to said secondary base at said top, a view port formed within said primary base, said view port being spaced from said specific path;

a print tray assembly connected to said secondary base at said bottom, said print tray assembly having print receiving means, said print receiving means adapted to contain an unexposed photographic print which is to intersect said specific path, a panel normally covering said print receiving means to prevent premature exposure of the print, said panel having a focusing target, said focusing target accurately representing the size and position of the photographic print, whereby a user can observe through said view port to magnify and focus the desirable image of the photographic transparency on said focusing target by moving of said slide housing relative to said base and then by physically moving of said slide holder select the desired position of the photographic transparency to achieve the desired photographic print and then removing said panel and then activating said light source to expose the photographic print; and when using said view port said lens being unrestricted to pass the maximum amount of light therethrough, said lens being restricted to pass less light when exposing the photographic print, said lens being constructed to have an automatic shift in focus to shift the established focus from said focusing target to the photographic print during exposure of the photographic print.

12. The combined photographic enlarger and print developing tray as defined in claim 1 wherein:

movement means for moving said lens housing (including said lens) and said slide housing relative to said primary base, said lens housing and slide housing also being capable of limited movement relative to said lens for purpose of focus adjustment prior to exposing the photographic print.

13. The combined photographic enlarger and print developing tray as defined in claim 12 wherein:

said movement means comprises a single movable knob assembly.

14. The combined photographic enlarger and print developing tray as defined in claim 1 wherein:

said light source comprising a viewing bulb and a printing bulb, said viewing bulb being used with said focusing target, said printing bulb being used to expose the photographic print, during activation of said viewing bulb said printing bulb is deactivated, during activation of said printing bulb said viewing bulb is deactivated.

15. A combined photographic enlarger and print developing tray comprising:

a slide housing, a light source mounted within said slide housing, said light source emitting light along a specific path, a slide receiving station formed within said slide housing, said slide receiving station adapted to connect with a photographic transparency;

a lens housing fixed to said slide housing, a lens mounted on said lens housing, said lens intersecting said specific path;

a base assembly having an enlarged internal chamber, said base assembly having a top and a bottom which are interconnected by a side wall assembly, said slide housing being connected by connecting means to said base assembly at said top, said connecting means permitting movement along said specific path of said slide housing in respect to said base assembly, said base assembly including a primary base and a secondary base, said primary base being attached to said slide housing, said secondary base being connected by interlocking means to said primary base, said primary base being readily connectable to different sizes of said secondary base;

a view port formed within said base assembly substantially at said top, said view port being spaced from said specific path;

a print tray assembly connected to said secondary base at said bottom, said print tray assembly having print receiving means being adapted to contain an unexposed photographic print, said print receiving means intersecting said specific path, a panel normally covering said print receiving means to prevent premature exposure of the print, said panel having a focusing target, said focusing target accurately representing the size and position of the photographic print, said panel being movable between a first position covering said print receiving means to a second position permitting access to said print receiving means, whereby a user can observe through said view port to magnify and focus the desirable image of the photographic transparency on said focusing target by moving of said slide housing relative to said base assembly and then by physically moving of said slide holder select the desired position of the photographic transparency to achieve the desired photographic print and then removing said panel and then activating said light source to expose the photographic print; and when using said view port said lens being unrestricted to pass the maximum amount of light therethrough producing a clear image on said focusing target with said panel in said first position, said lens being restricted during passing of light therethrough to expose the photographic print with said panel in said second position causing an automatic shift in focus producing a clear image on the photographic print.

16. The combined photographic enlarger and print developing tray as defined in claim 15 including:

a color filter assembly mounted within said slide housing, said color filter assembly intersecting said specific path.

17. The combined photographic enlarger and print developing tray as defined in claim 16 wherein:

said color filter assembly comprising a plurality of separate color filters, each said color filter being individually movable between positions intersecting said specific path and not intersecting said specific path, by locating of a said color filter in an intermediate intersecting position with said specific path the intensity of the produced color can be varied.

18. The combined photographic enlarger and print developing tray as defined in claim 15 wherein:
aperture means mounted within said lens housing, said aperture means being movable between a position substantially covering said lens to a position being spaced from said lens, said aperture means substantially covering said lens when said panel is in said second position, said aperture means being spaced from said lens when said panel is in said first position.

19. The combined photographic enlarger and print developing tray as defined in claim 15 wherein:
said connecting means including a gear assembly, said gear assembly including a rack and pinion gear arrangement.

20. The combined photographic enlarger and print developing tray as defined in claim 19 wherein:
said connecting means further includes a bellows.

21. The combined photographic enlarger and print developing tray as defined in claim 15 wherein:
said view port including a lid, said lid being movable to position to close said view port.

22. The combined photographic enlarger and print developing tray as defined in claim 15 wherein:
said light source comprising a viewing bulb and a printing bulb, said viewing bulb being used with said focusing target, said printing bulb being used to expose the photographic print, during activation of said viewing bulb said printing bulb is deactivated, during activation of said printing bulb said viewing bulb is deactivated.

23. A combined photographic enlarger and print developing tray comprising:
a slide housing, a light source mounted within said slide housing, said light source emitting light along a specific path, a slide receiving station formed within said slide housing, said slide receiving station adapted to connect with a photographic transparency;
a lens housing fixed to said slide housing, a lens mounted on said lens housing, said lens intersecting said specific path;
a base assembly having an enlarged internal chamber, said base assembly having a top and a bottom which are interconnected by a side wall assembly, said slide housing being connected by connecting means to said base assembly at said top, said connecting means permitting movement along said specific path of said slide housing in respect to said base assembly, said base assembly including a primary base and a secondary base, said primary base being attached to said slide housing, said secondary base being connected by interlocking means to said primary base, said primary base being readily connectable to different sizes of said secondary base;
a view port formed within said base assembly substantially at said top, said view port being spaced from said specific path;
a print tray assembly connected to said secondary base at said bottom, said print tray assembly having print receiving means being adapted to contain an unexposed photographic print, said print receiving means intersecting said specific path, a panel normally covering said print receiving means to prevent premature exposure of the print, said panel having a focusing target, said focusing target accurately representing the size and position of the photographic print, whereby a user can observe through said view port to magnify and focus the desirable image of the photographic transparency on said focusing target by moving of said slide housing relative to said base assembly and then by physically moving of said slide holder select the desired position of the photographic transparency to achieve the desired photographic print and then removing said panel and then activating said light source to expose the photographic print;
said panel being slidably engaged with said tray, said panel being slidable between a first position covering said print receiving means to a second position permitting access to said print receiving means; and
a plurality of hold down pins being mounted on said print tray assembly and located within said print receiving chamber, said hold down pins being spaced apart and located about the periphery of said print receiving means, whereby said hold down pins are to function to hold in place the photographic print when such is located within said print receiving means.

24. The combined photographic enlarger and print developing tray as defined in claim 23 wherein:
said print receiving means including a planar surface, said tray including a groove assembly, said panel being slidably engaged with said groove assembly, said panel including a plurality of protuberances, movement of said panel from said second position to said first position covering the photographic print causes said protuberances to be conducted across the surface of the photographic print to insure that the photographic print is positioned substantially flat against said planar surface of said print receiving means.

25. A photographic print and developing tray comprising:
a tray housing formed of a bottom wall and a side wall assembly located about the periphery of the bottom wall, said side wall assembly enclosing an internal chamber, the uppermost edge of said wall assembly forming an access opening, engaging means connected to said side wall assembly at said access opening, said internal chamber being divided into a planar section and an elongated channel;
a cover to connect in a closed position with said engaging means in a light-tight manner, said cover being slidably movable to an open position permitting unrestricted access into said planar section;
an aperture formed within said cover, said aperture being adapted to pass a liquid into said elongated channel with said cover in said closed position, upon said tray housing being sufficiently tipped the liquid is caused to come into contact with said planar section substantially covering such;
said planar section having a periphery, a plurality of spaced-apart hold down pins attached to said tray housing at said periphery, whereby said hold down pins functioning to hold in place a photographic print flat against said planar section;
said cover including a plurality of protuberances, said protuberances extending within said internal chamber, during movement of said cover between said closed position to said open position said protuberances to pass directly over and totally across said planar section; and baffle means mounted on said cover and extending into said elongated channel, with said cover in said closed position said baffle means preventing light from entering into said planar section but said baffle means will permit the liquid to be conducted into said planar section.

26. The photographic print and developing tray as defined in claim 25 wherein:

said engaging means includes a seal, said seal being located between said tray housing and said cover.

27. The photographic print and developing tray as defined in claim 26 wherein:

means for tightly connecting together said cover and said tray housing tightly pressing said seal only when said cover is in said closed position.

28. The combined photographic enlarger and print developing tray as defined in claim 1 wherein:

said lens housing including a shutter, said shutter including an aperture, said shutter being movable between a covering position substantially covering said lens to a spaced position being spaced from and not interfering with light passing through said lens, said covering position permitting light to only pass through said aperture producing a clear focus at a print plane, with said shutter in said spaced position said lens produces a clear focus at a focusing plane, said focusing plane being at a different distance from said lens than said print plane.

29. The combined photographic enlarger and print developing tray as defined in claim 28 wherein:

said print plane being farther from said lens than said focusing plane.

30. The combined photographic enlarger and print developing tray as defined in claim 15 wherein:

said lens housing including a shutter, said shutter including an aperture, said shutter being movable between a covering position substantially covering said lens to a spaced position being spaced from and not interfering with light passing through said lens, said covering position permitting light to only pass through said aperture producing a clear focus at a print plane, with said shutter in said spaced position said lens produces a clear focus at a focusing plane, said focusing plane being at a different distance from said lens then said print plane.

31. The combined photographic enlarger and print developing tray as defined in claim 30 wherein:

said print plane being farther from said lens than said focusing plane.

32. A combined photographic enlarger and print developing tray comprising:

a slide housing, a light source mounted within said slide housing, said light source emitting light along a specific path, a slide receiving station formed within said slide housing, said slide receiving station adapted to connect with a photographic transparency;

a lens housing connected to said slide housing, a lens mounted on said lens housing, said lens intersecting said specific path;

a base having an enlarged interior chamber, said base having a top and a bottom which are interconnected by an enclosing sidewall, said slide housing being connected to said base at said top;

a print tray assembly connected to said base at said bottom, said print tray assembly having print receiving means adapted to contain an unexposed photographic print, said print receiving means intersecting said specific path, said print receiving means having a print plane, a plane normally covering said print receiving means to prevent premature exposure of the unexposed photographic print, said panel having a focusing target located at a focusing plane, said focusing plane being spaced from said print plane, said panel being movable to gain access to said print receiving means;

a view port formed within said base, said view port being spaced from said specific path, said view port being for the purpose of observing said focusing target; and said slide housing and said lens housing being movable by movement means along said specific path for the purpose of magnifying of the image on said focusing target in which said lens moves in unison with said slide housing and said lens housing, said movement means further permitting limited focusing adjusting movement of said lens housing and said slide housing relative to said lens.

33. A combined photographic enlarger and print developing tray as defined in claim 32 wherein:

said movement means comprising a single operable knob assembly which is utilized for both moving of said slide housing and said lens housing along said specific path and also said focusing adjusting movement, during said focusing adjusting movement said single operable knob assembly is moved in a different direction in order to achieve movement of said slide housing and said lens housing in order to obtain magnification.

34. A combined photographic enlarger and print developing tray comprising:

a slide housing, a light source mounted within said slide housing, said light source emitting light along a specific path, a slide receiving station formed within said slide housing, said slide receiving station adapted to connect with a photographic transparency;

a lens housing connected to said slide housing, a lens mounted on said lens housing, said lens intersecting said specific path;

a base having an enlarged interior chamber, said base having a top and a bottom which are interconnected by an enclosing sidewall, said slide housing being connected to said base at said top;

a print tray assembly connected to said base at said bottom, said print tray assembly having print receiving means adapted to contain an unexposed photographic print, said print receiving means intersecting said specific path, said print receiving means having a print plane, a panel normally covering said print receiving means to prevent premature exposure of the unexposed photographic print, said panel having a focusing target located at a focusing plane, said focusing plane being spaced from said print plane, said panel being movable to gain access to said print receiving means;

a view port formed within said base, said view port being spaced from said specific path, said view port being for the purpose of observing said focusing target; and said light source comprising a viewing bulb and a printing bulb, said viewing bulb being used with said focusing target, said printing bulb being used to expose the unexposed photographic print, during activation of said viewing bulb said printing bulb is deactivated, during activation of said printing bulb said viewing bulb is deactivated.

35. A combined photographic enlarger and print developing tray comprising:
   a slide housing, a light source mounted within said slide housing, said light source emitting light along a specific path, a slide receiving station formed within said slide housing, said slide receiving station adapted to connect with a photographic transparency;
   a lens housing connected to said slide housing, a lens mounted on said lens housing, said lens intersecting said specific path;
   a base having an enlarged interior chamber, said base having a top and a bottom which are interconnected by an enclosing sidewall, said slide housing being connected to said base at said top;
   a print tray assembly connected to said base at said bottom, said print tray assembly having print receiving means adapted to contain an unexposed photographic print, said print receiving means intersecting said specific path, said print receiving means having a print plane, a panel normally covering said print receiving means to prevent premature exposure of the unexposed photographic print, said panel having a focusing target located at a focusing plane, said focusing plane being spaced from said print plane, said panel being movable to gain access to said print receiving means;
   a view port formed within said base, said view port being spaced from said specific path, said view port being for the purpose of observing said focusing target; and
   said lens housing including a shutter, said shutter including an aperture, said shutter being movable between a covering position substantially covering said lens to a spaced position being spaced from and not interfering with light passing through said lens, said covering position permitting light to only pass through said aperture producing a clear focus at said print plane, with said shutter in said spaced position said lens produces a clear focus at said focusing plane.

36. A combined photographic enlarger and print developing tray comprising:
   a slide housing, a light source mounted within said slide housing, said light source emitting light along a specific path, a slide receiving station formed within said slide housing, said slide receiving station adapted to connect with a photographic transparency;
   a lens housing connected to said slide housing, a lens mounted on said lens housing, said lens intersecting said specific path;
   a base having an enlarged interior chamber, said base having a top and a bottom which are interconnected by an enclosing sidewall, said slide housing being connected to said base at said top;
   a print tray assembly connected to said base at said bottom, said print tray assembly having print receiving means adapted to contain an unexposed photographic print, said print receiving means intersecting said specific path, said print receiving means having a print plane, a panel normally covering said print receiving means to prevent premature exposure of the unexposed photographic print, said panel having a focusing target located at a focusing plane, said focusing plane being spaced from said print plane, said panel being movable to gain access to said print receiving means;
   a view port formed within said base, said view port being spaced from said specific path, said view port being for the purpose of observing said focusing target; and
   when using said view port lens being unrestricted to pass the maximum amount of light therethrough producing a clear image on said focusing target, said lens being restricted during passage of light therethrough to expose the unexposed photographic print causing an automatic shift in focus producing a clear image on the photographic print.

* * * * *